June 29, 1965 P. A. PHILLIPS ETAL 3,192,094
AUTOMATIC BIAS CUTTING AND SPLICING MACHINE
Filed April 20, 1960 14 Sheets-Sheet 1
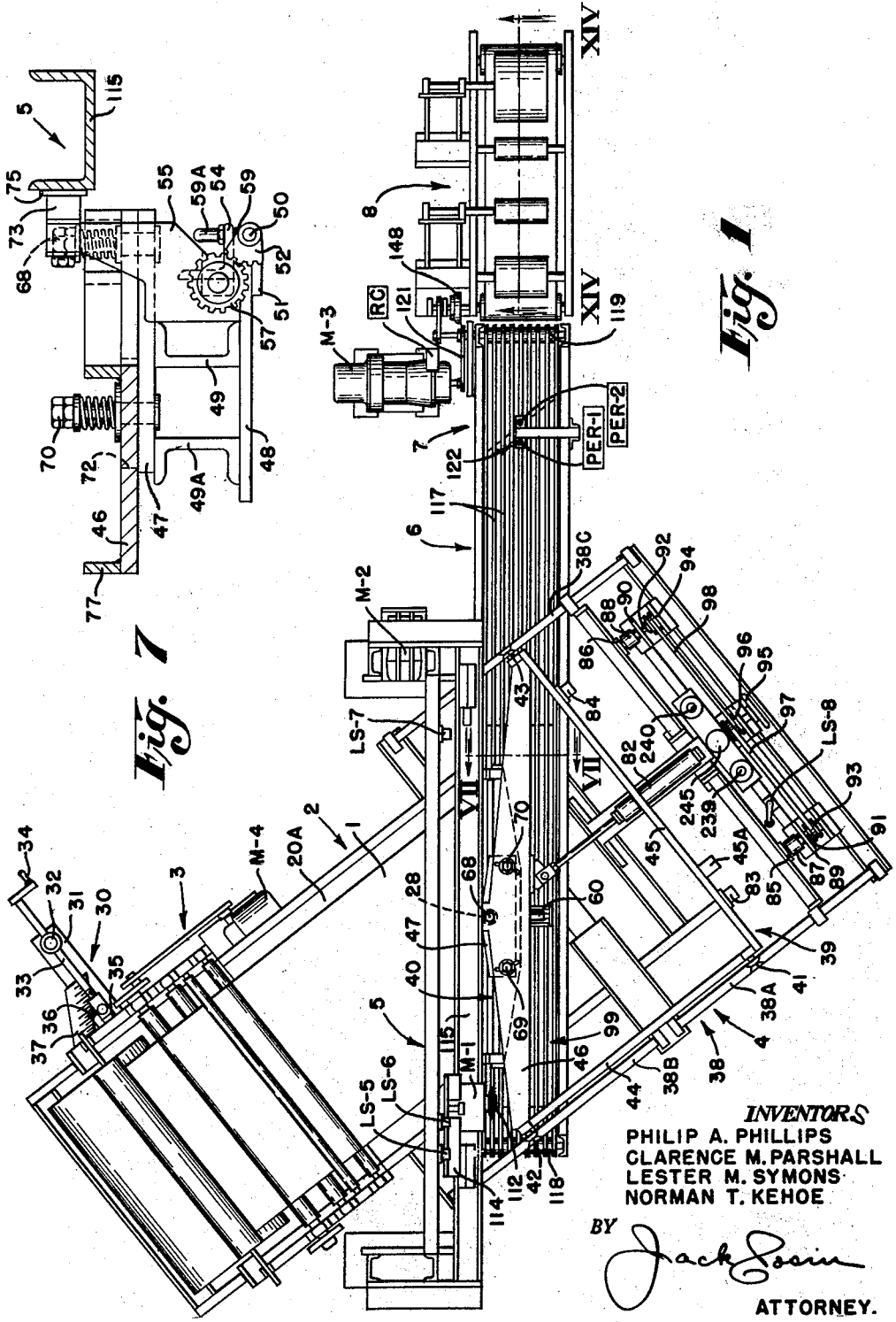
INVENTORS
PHILIP A. PHILLIPS
CLARENCE M. PARSHALL
LESTER M. SYMONS
NORMAN T. KEHOE
BY
ATTORNEY.

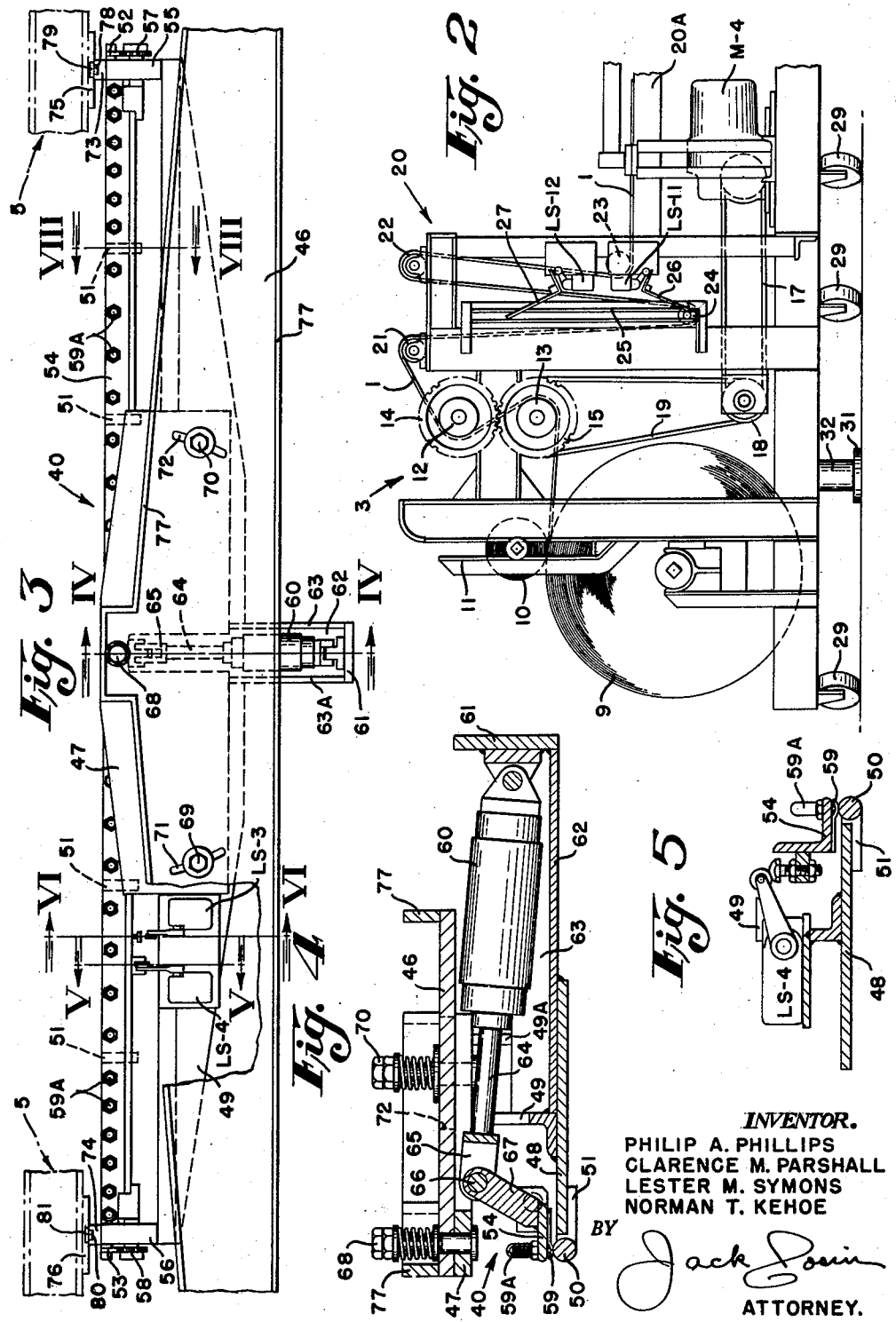

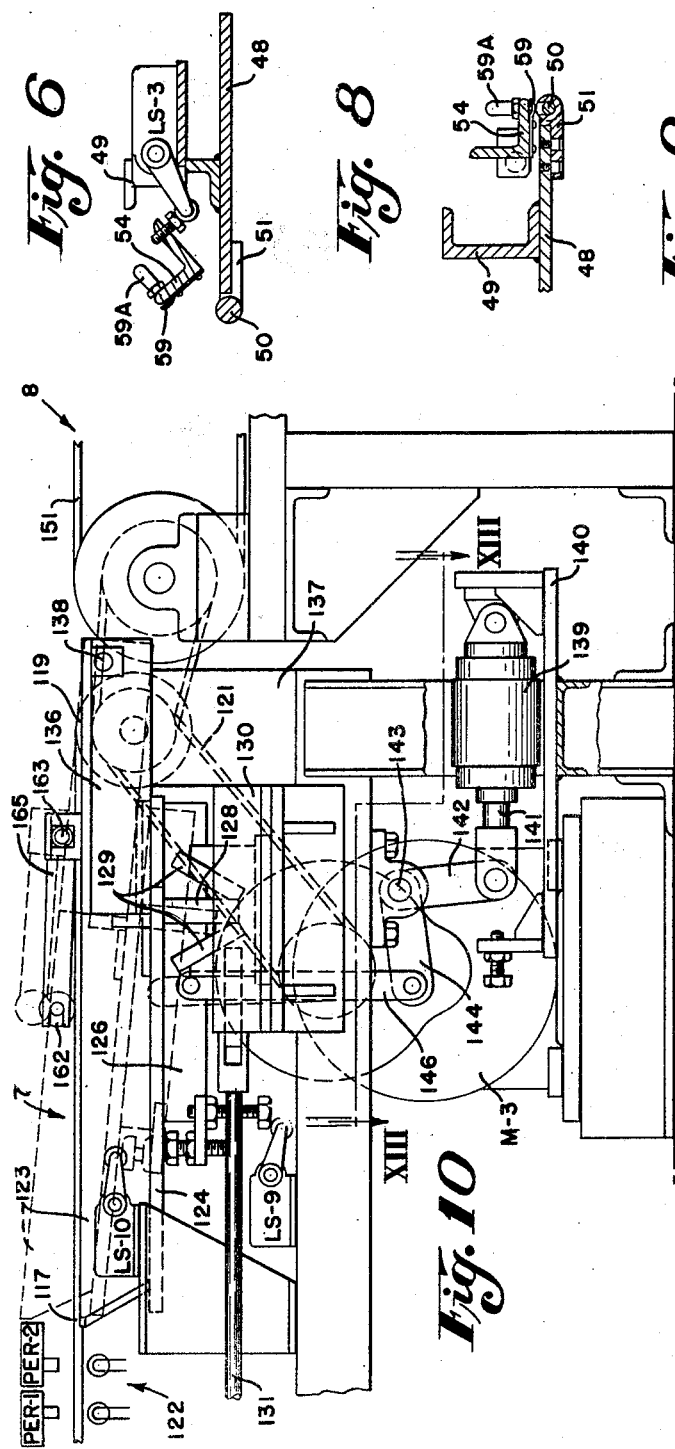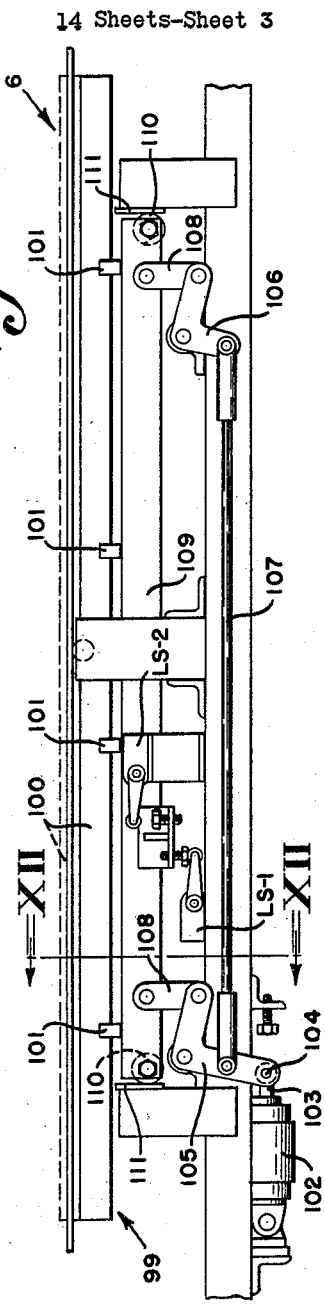

June 29, 1965 P. A. PHILLIPS ETAL 3,192,094
AUTOMATIC BIAS CUTTING AND SPLICING MACHINE
Filed April 20, 1960 14 Sheets-Sheet 4

INVENTOR.
PHILIP A. PHILLIPS
CLARENCE M. PARSHALL
LESTER M. SYMONS
NORMAN T. KEHOE
BY
ATTORNEY.

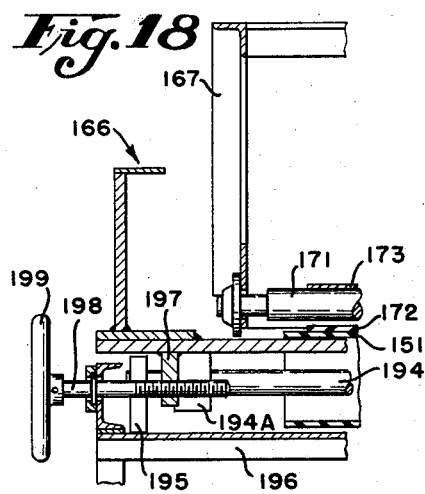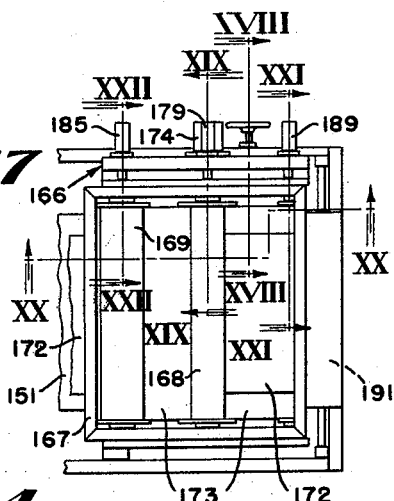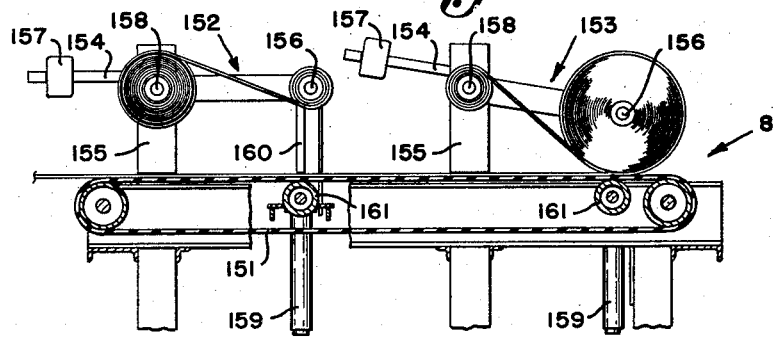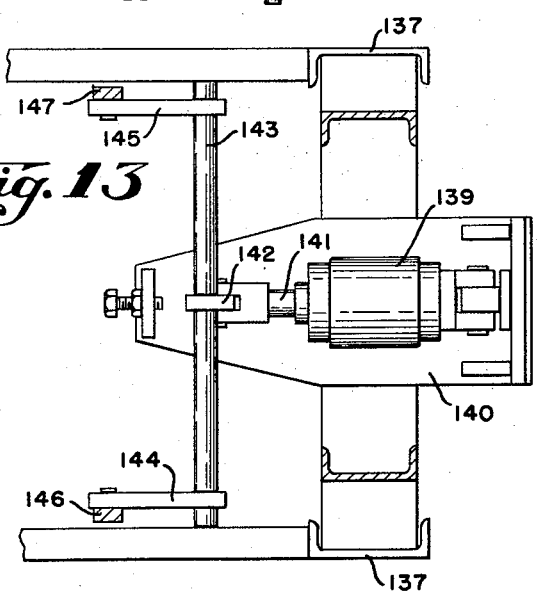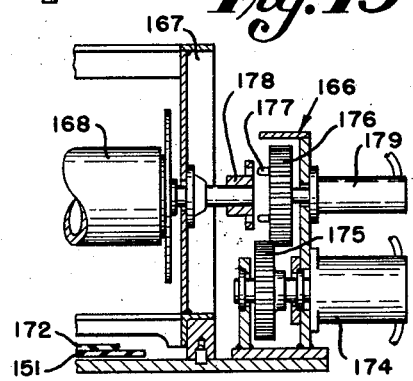

INVENTOR.
PHILIP A. PHILLIPS
CLARENCE M. PARSHALL
LESTER M. SYMONS
NORMAN T. KEHOE

BY

ATTORNEY.

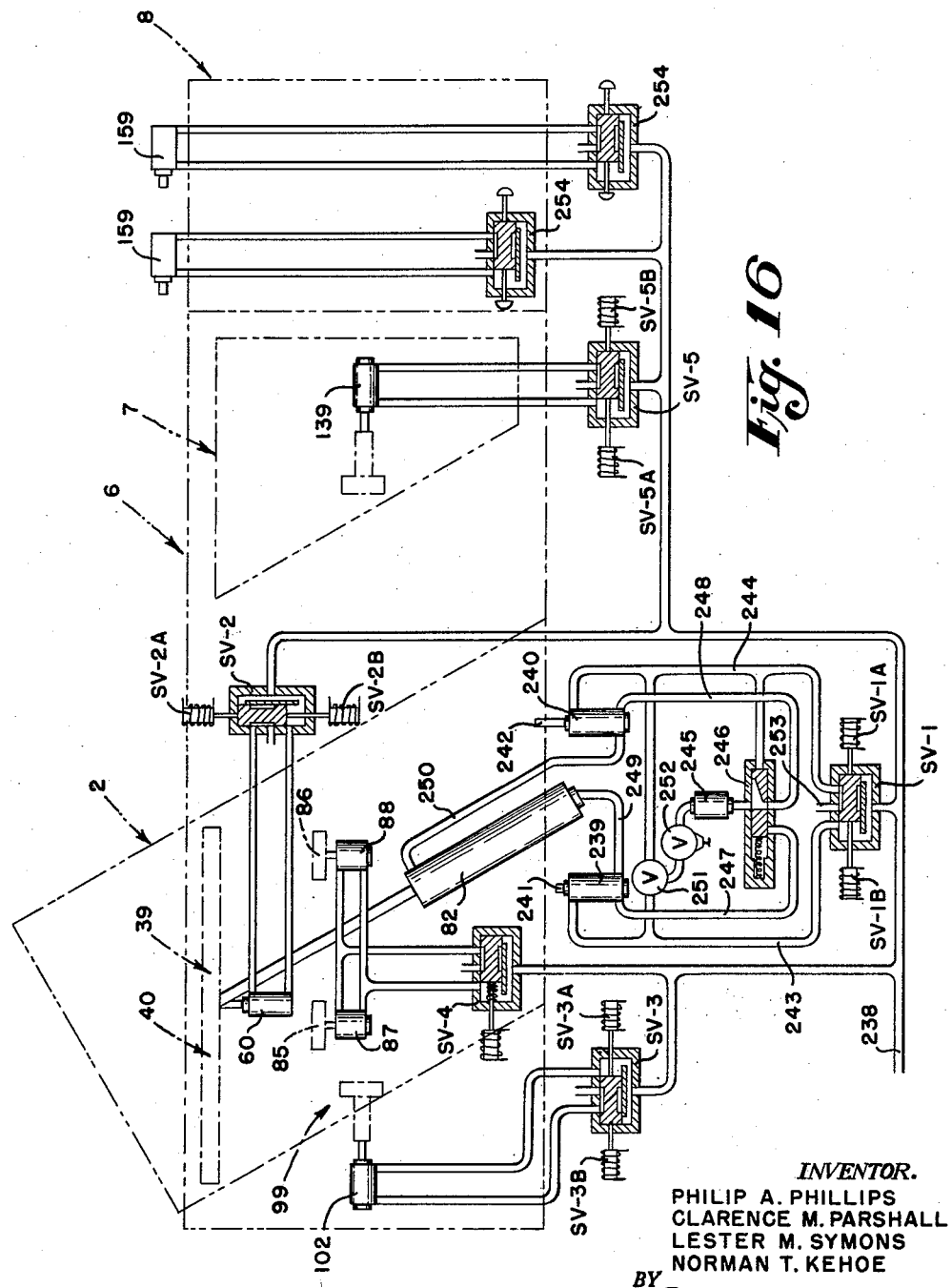

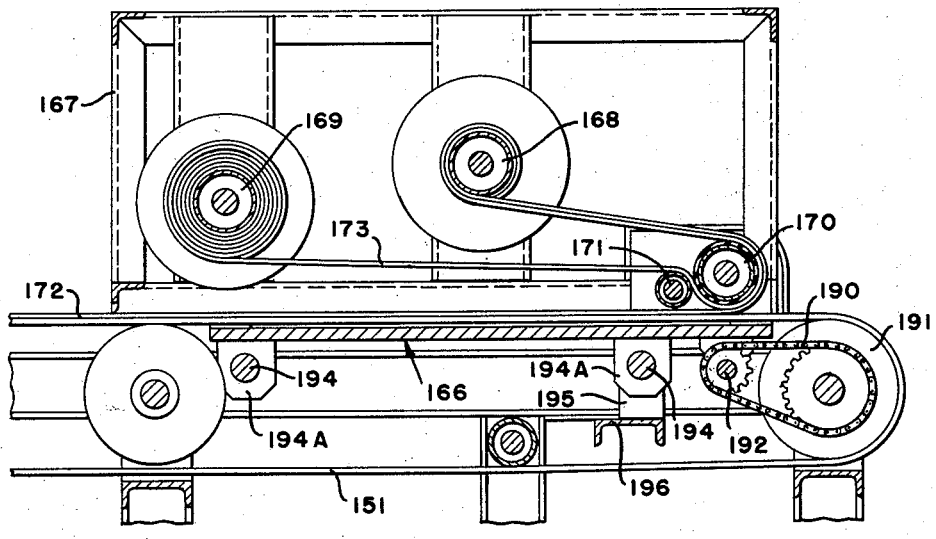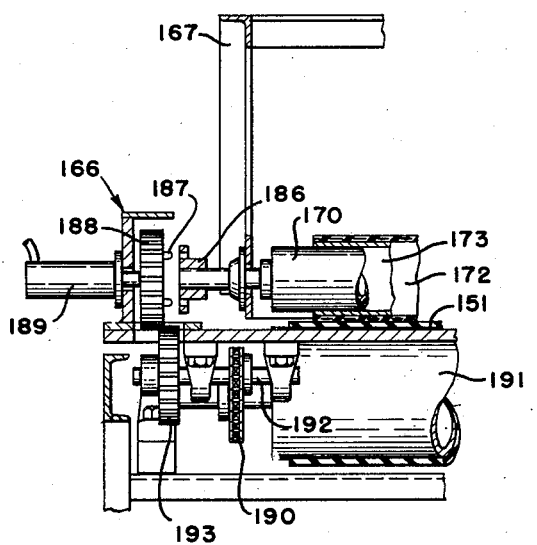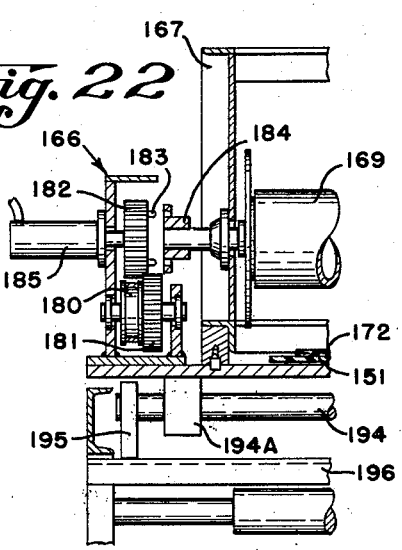

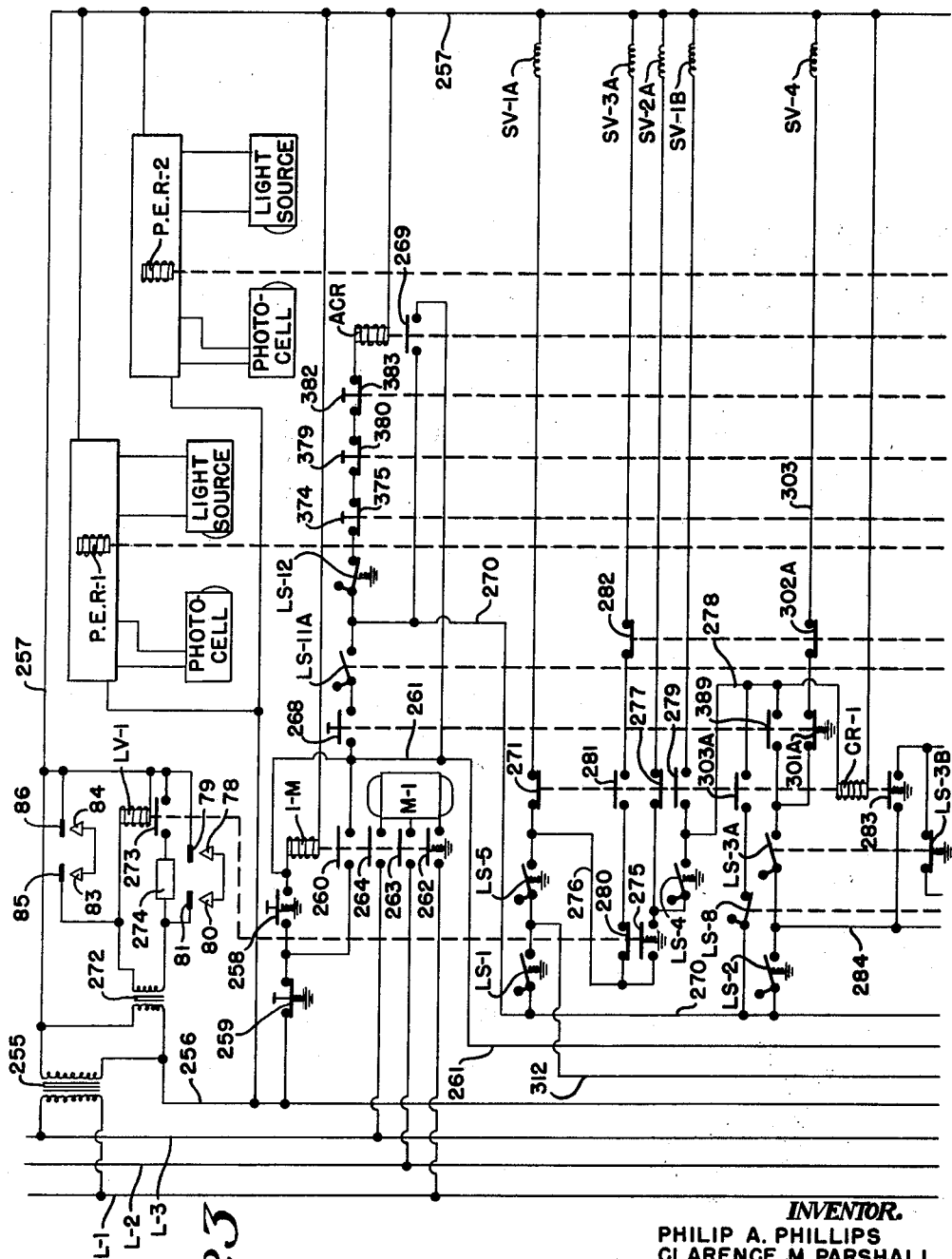

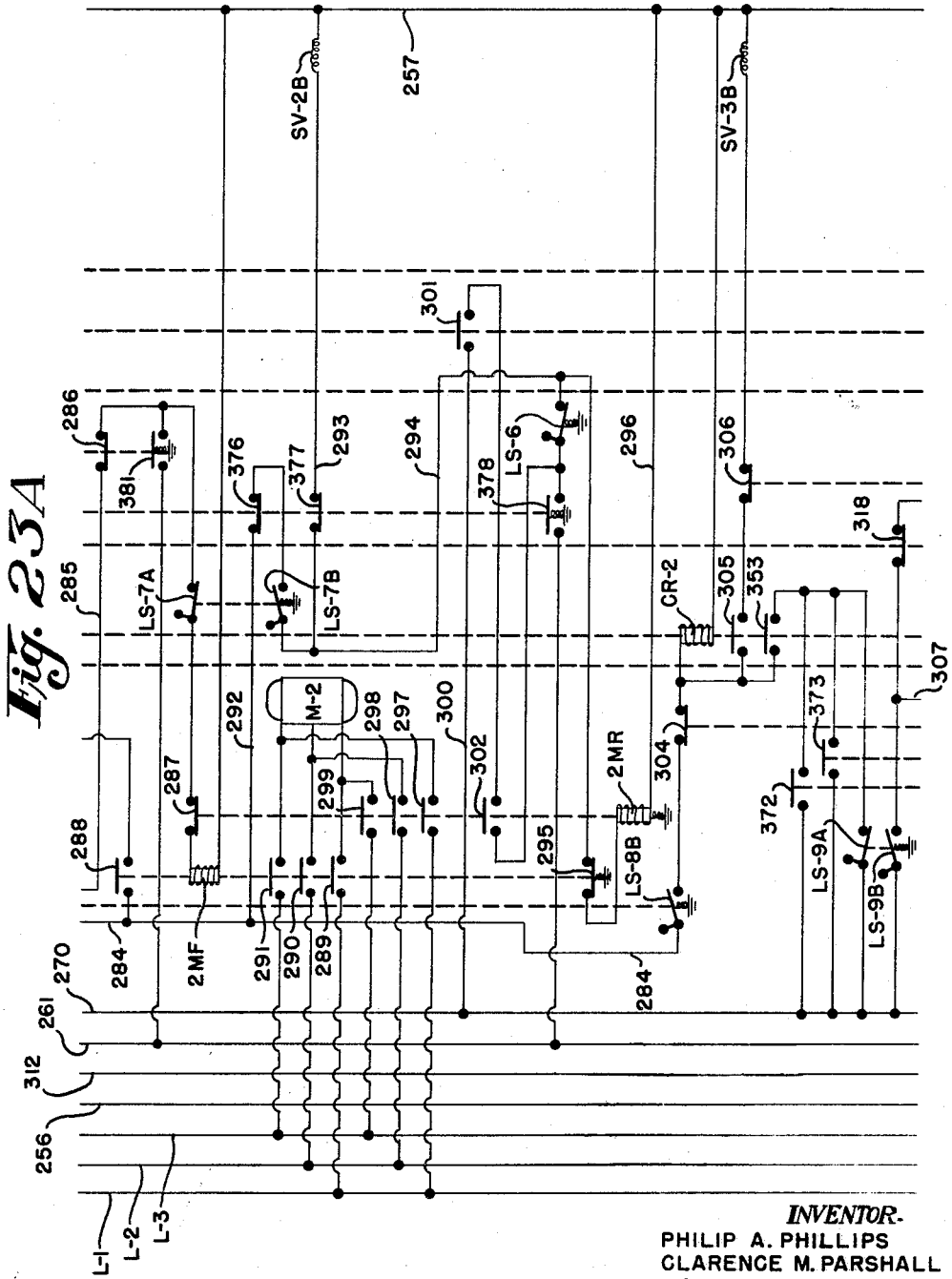

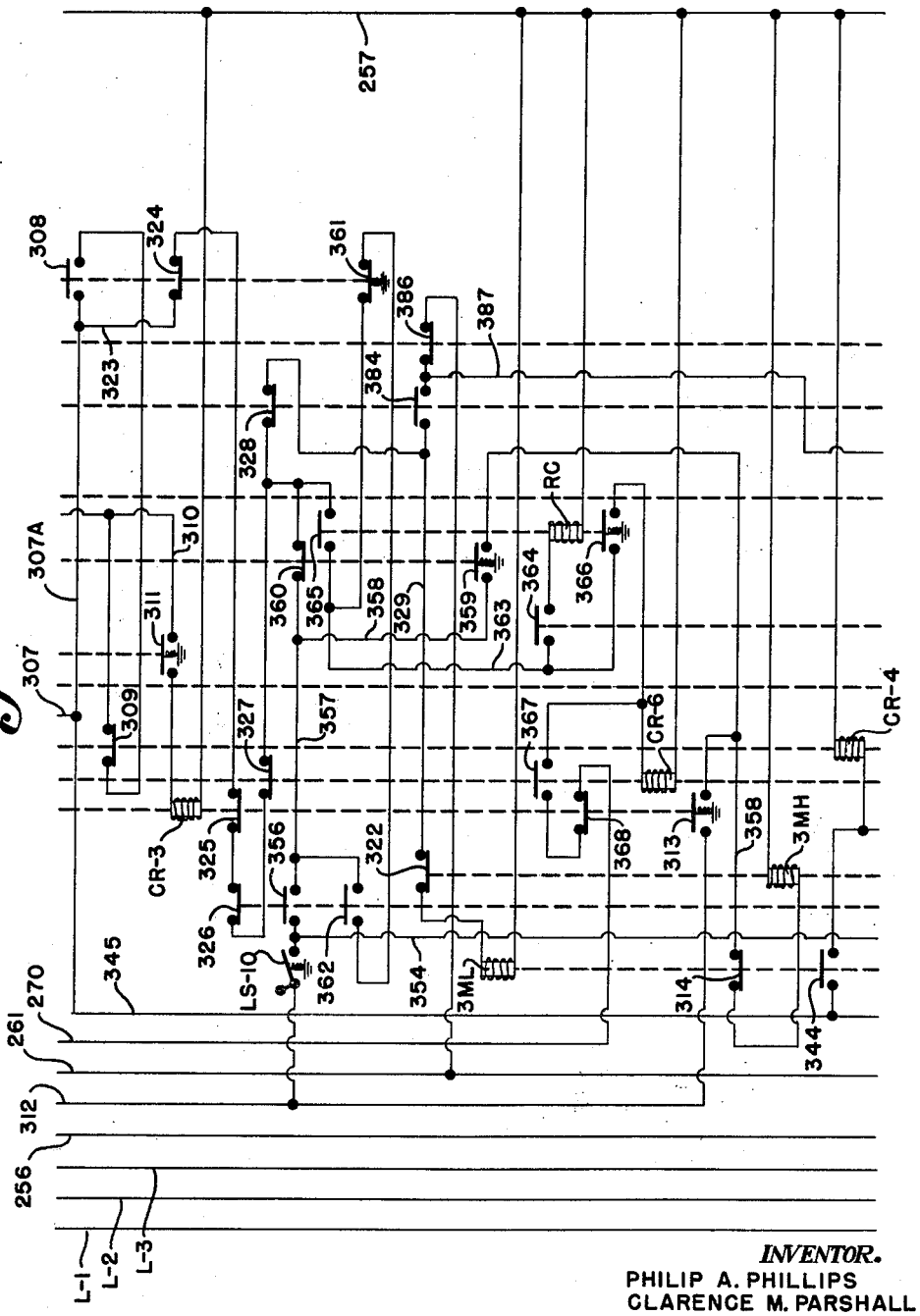

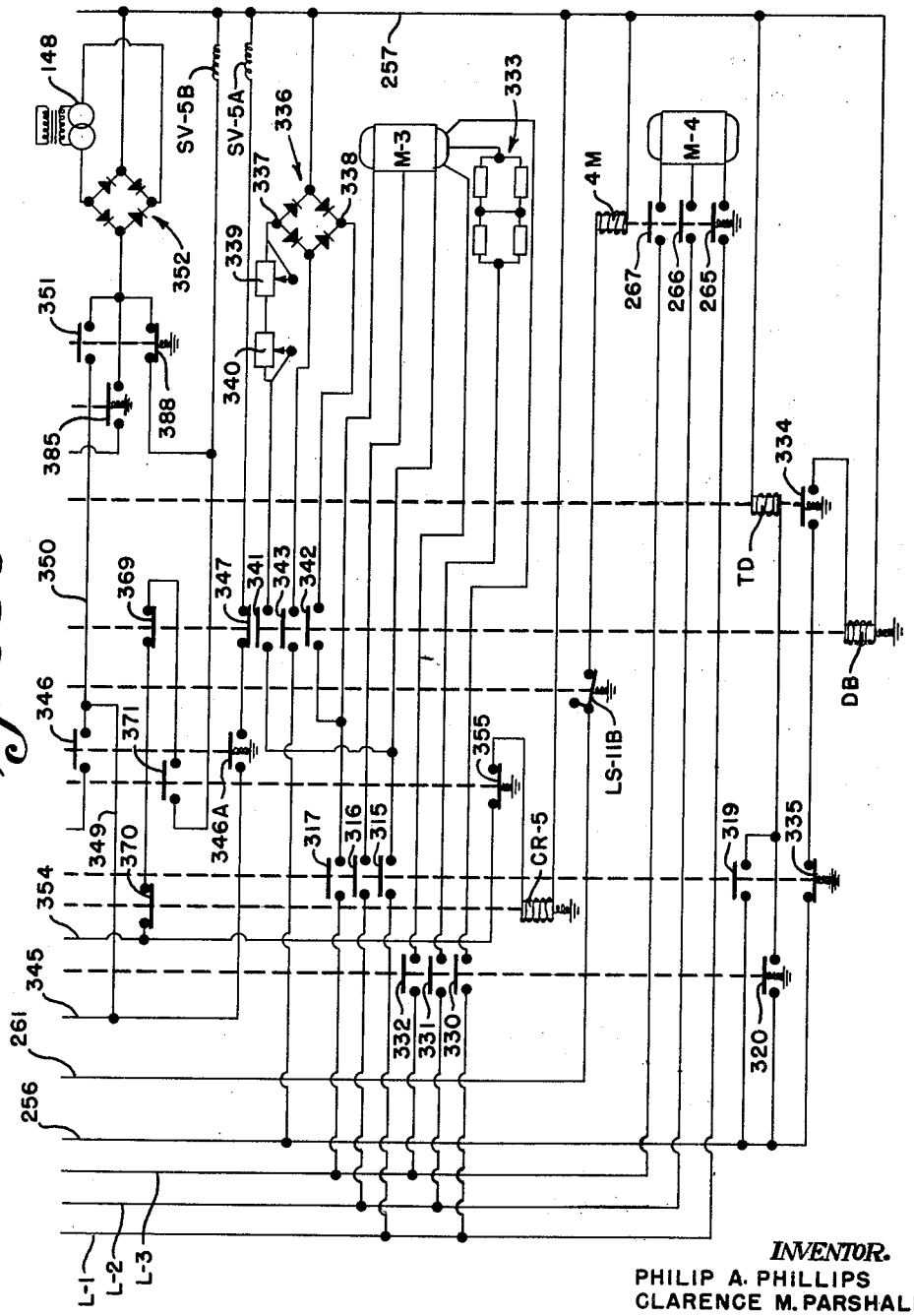

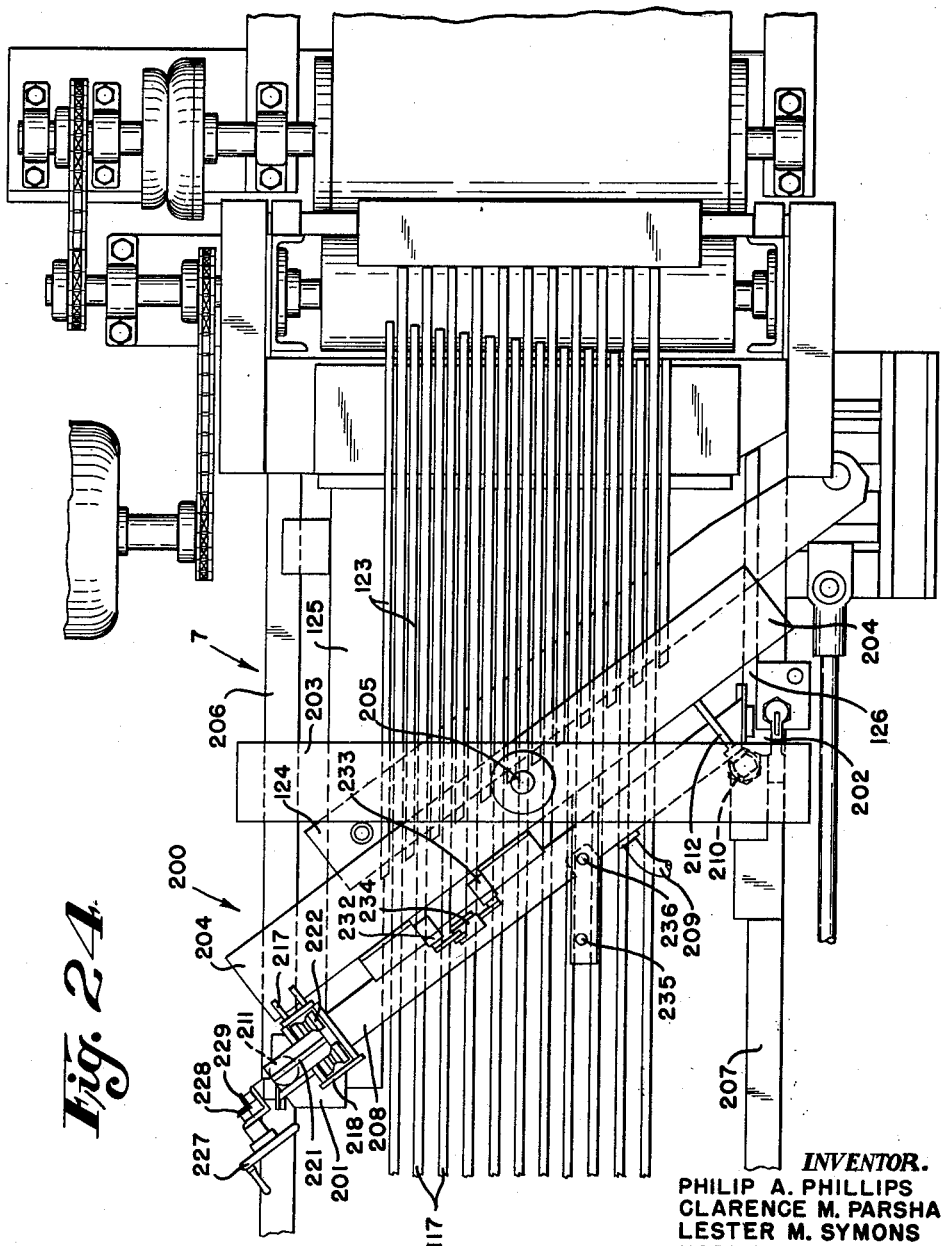

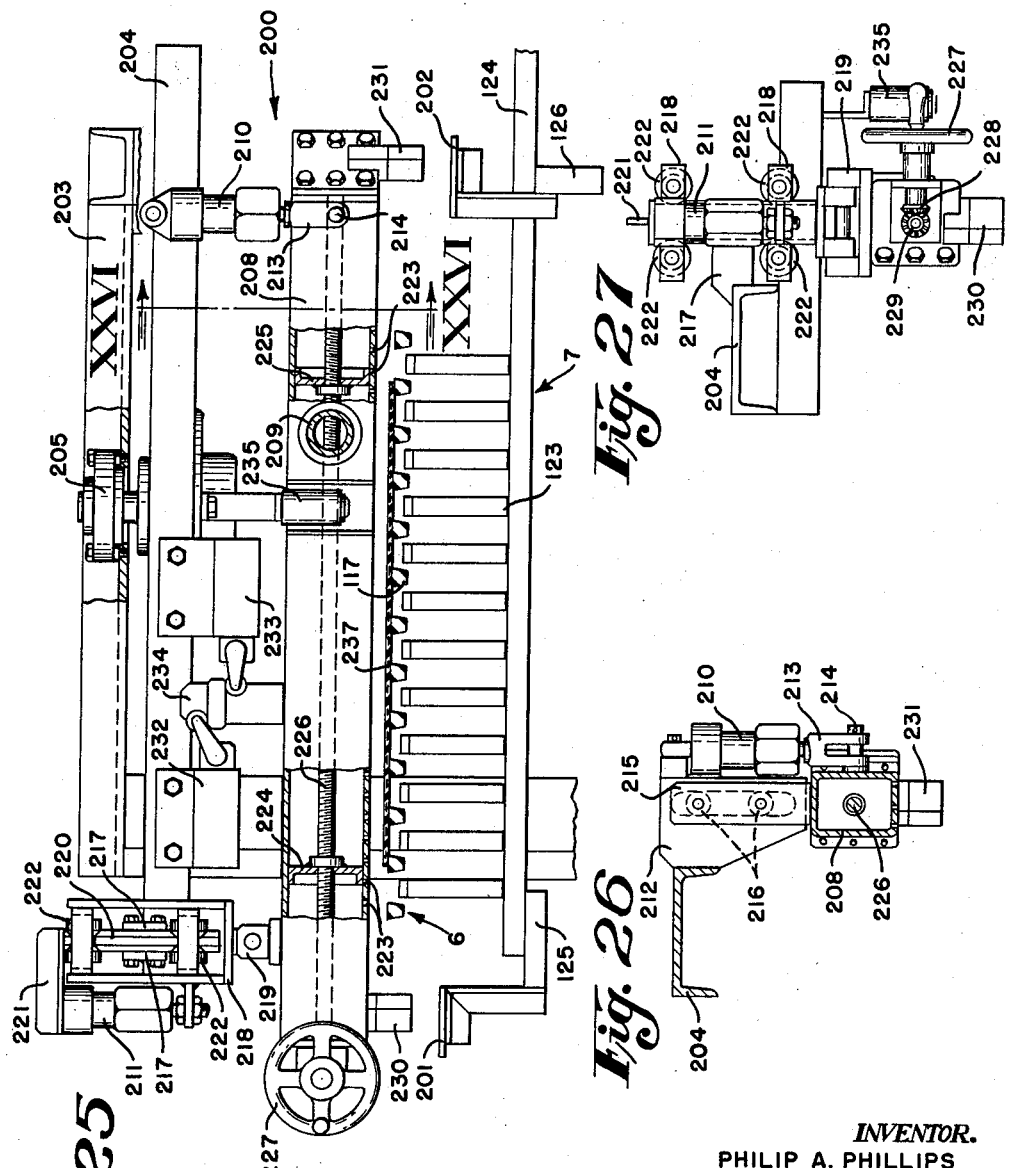

United States Patent Office 3,192,094
Patented June 29, 1965

3,192,094
AUTOMATIC BIAS CUTTING AND SPLICING MACHINE
Philip A. Phillips and Clarence M. Parshall, Detroit, Lester M. Symons, Southfield, and Norman T. Kehoe, Detroit, Mich., assignors to United States Rubber Company, New York, N.Y., a corporation of New Jersey
Filed Apr. 20, 1960, Ser. No. 23,500
22 Claims. (Cl. 156—353)

This invention relates to a machine for processing tire fabrics and, more particularly, to a machine for automatically severing tire-making fabrics into bias-cut sections and splicing the cut sections into a continuous bias-cut strip.

Bias-cut, rubber-coated, fabrics are conventionally used in the manufacture of rubber tires to add strength to the completed tire. Prior to being bias-cut, the fabric is manufactured as a continuous web or strip of rubber coated material having parallelly arranged structural cords running in the longitudinal direction of the web and thin weft or pick threads interspersed thereacross at spaced intervals to retain the structural cords in alignment during the calendering or rubber coating operation. After fabrication of a calendered web of tire fabric having longitudinally arranged structural cords, the fabric is usually cut into rhombic shaped sections by a bias cutting operation and the cut sections are manually spliced or joined together in overlapped end-wise relationship to form a second continuous web of bias-cut calendered fabric that is suitable for use in the building up of a tire carcass.

At present, a major portion of the tire fabric utilized by the rubber tire industry is bias-cut and spliced into continuous strips by time consuming and expensive manual operations. Although various proposals have been set forth by which automation of the bias-cutting and splicing operations may be effected, these proposals have not been adopted in their entirety for a number of reasons, some of which will be set forth below.

In order to achieve wide acceptance by industry the complex and expensive automatic bias-cutting and splicing machines must be capable of turning out uniformly made bias-cut fabric at a high rate of production. Additionally, provisions must be incorporated into the machines for simply and accurately changing both the width of the bias-cut fabric, and the bias-cutting angle at which it is cut, without entailing extended delays occasioned by the shutting down of the machines for these purposes. This is necessary in order for the machines to be flexible enough to be used in the manufacture of various sized tires.

Previous attempts to develop automatic bias-cutting and splicing machines have not successfully provided for all of the foregoing features. In some cases uniformity of the end product has been lacking due to the machines not being able to accurately align successive cut sections of fabric for subsequent splicing. In other cases the amount of overlap at the splice between successive cut sections of fabric has not been properly provided for. Similarly, prior machines have incorporated periodic or timer controlled operations, rather than sequential operations in which each subsequent action of the machine is initiated by the completion of a next preceding step, the former resulting in a relatively low output by the machines in comparison with their cost.

Accordingly, it is one object of this invention to provide an improved bias-cutting and splicing machine for tire fabrics.

Another object of this invention is to provide a machine having its components cooperatively arranged so as to accurately align the bias-cut sections preparatory to splicing them together.

An additional object of this invention is to provide improved splicing means for controlling the amount of overlap between adjacent bias-cut sections of fabric.

A further object of this invention is to provide an improved bias cutting and splicing machine having rapid automatic sequential control features which increase the output of the machine.

Another object of this invention is to provide an automatic bias-cutting and splicing machine having means for controlling and adjusting the width of the bias cut fabric.

A still further object of the invention is to provide an automatic bias-cutting and splicing machine having means for accurately controlling and adjusting the bias angle at which the fabric is cut.

Further objects and advantages of this invention will become apparent as the following description proceeds.

Briefly stated, in accordance with one embodiment of this invention, fabric cutting means are utilized in conjunction with fabric feeding means that are pivotally located with respect to the cutting means and arranged to intermittently feed predetermined lengths of tire fabric thereby, to repetitively cut a continuous web of fabric into a plurality of bias-cut sections; conveying means positioned below and aligned in parallel with the cutting means receive the successive cut sections of fabric and convey them in alignment with each other to splicing means wherein the successive bias-cut sections are joined together by a controlled overlapped splice to form a continuous strip of bias-cut fabric.

While the specification concludes with claims particularly pointing out and distinctly claiming the subject matter of this invention, it is believed that the invention will be better understood from the following description taken in connection with the accompanying drawings in which:

FIG. 1 is a diagrammatic plan view of a machine constructed in accordance with the present invention;
FIG. 2 is an elevational view of the fabric let-off unit of the machine shown in FIG. 1;
FIG. 3 is a plan view of the fabric clamping mechanism of the machine of FIG. 1;
FIG. 4 is a sectional view, taken along the line IV—IV of FIG. 3, showing the means utilized to support and actuate the fabric clamper of FIG. 3;
FIG. 5 is a sectional view, taken along the line V—V of FIG. 3, showing one limit switch used in conjunction with the fabric clamper to control sequential operation of the machine;
FIG. 6 is a sectional view, taken along the line VI—VI of FIG. 3, showing a second limit switch used in conjunction with the fabric clamper to control sequential operation of the machine;
FIG. 7 is an end elevation, taken along the line VII—VII of FIG. 1, of the fabric clamping mechanism of FIG. 3;
FIG. 8 is a sectional view, taken along the line VIII—VIII of FIG. 3, showing details of the fabric clamper mounting;
FIG. 9 is a side elevational view of a portion of the conveying means showing an elevator platform utilized in lowering cut sections of fabric from the fabric cutter to the conveyor;
FIG. 10 is a side elevational view, partly in section, of another portion of the conveying means showing one form of fabric splicer which is raised and lowered to effect endwise splices between adjacent cut sections of fabric;
FIG. 11 is a plan view of the fabric splicer of FIG. 10;
FIG. 12 is a sectional view, taken along the line XII—

XII of FIG. 9, of the arrangement of the elevator platform with respect to the conveyor;

FIG. 13 is a sectional view, taken along the line XIII—XIII of FIG. 10, showing the means utilized to drive the fabric splicer between its raised and lowered position;

FIG. 14 is a sectional view, taken along the line XIV—XIV of FIG. 1, showing one form of fabric wind-up means that may be used to wind the continuous strip of bias-cut fabric into a roll;

FIG. 16 is a schematic piping diagram showing a hydraulic-pneumatic control system that may be used in the machine of FIG. 1;

FIG. 17 is a plan view of a modified form of fabric wind-up means having a removable fabric storage unit;

FIG. 18 is a sectional view, taken along the line XVIII—XVIII of FIG. 17, showing a transverse position adjusting device for the fabric wind-up means of FIG. 17;

FIG. 19 is a sectional view, taken along the line XIX—XIX of FIG. 17, showing a releasable wind-up roll drive mechanism;

FIG. 20 is a sectional view, taken along the line XX—XX of FIG. 17, showing the relative positioning of the various rolls used in the fabric wind-up means of FIG. 17;

FIG. 21 is a sectional view taken along the line XXI—XXI of FIG. 17, showing the manner in which the driving roll is selectively driven;

FIG. 22 is a sectional view, taken along the line XXII—XXII of FIG. 17, showing a friction brake arrangement selectively engageable with the fabric liner roll;

Figure 11:
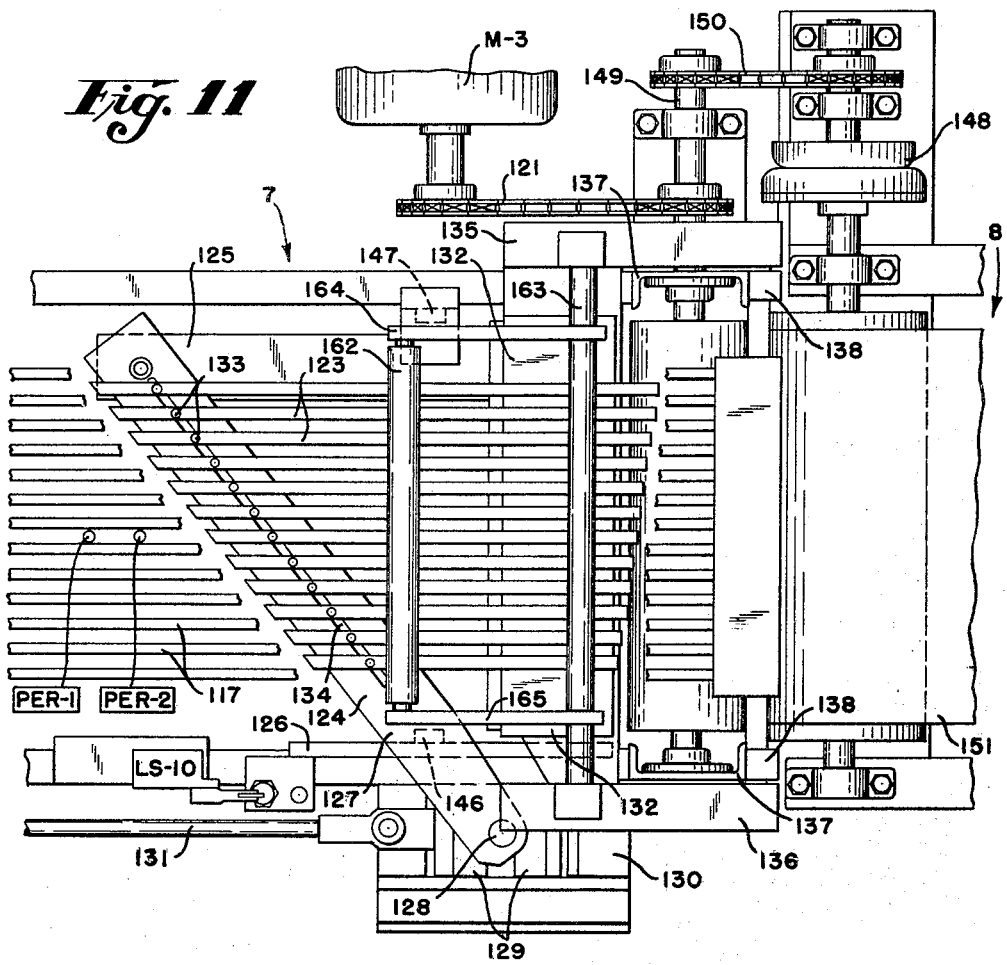

FIGS. 23, 23A, 23B and 23C each show partial schematic drawings of an overall electrical control system that may be utilized to control the operation of the machine of FIG. 1;

FIG. 24 represents a modification to the fabric splicer of FIGS. 10 and 11 and is a plan view of a splicer incorporating a vacuum lifter;

FIG. 25 is an elevational view of the splicer of FIG. 24 with portions broken away to show internal structure;

FIG. 26 is a sectional view, taken along the line XXVI—XXVI of FIG. 25, showing details of a portion of the vacuum box support; and FIG. 27 is an end elevation of a portion of the splicer of FIG. 25 showing additional details of the vacuum box support.

Referring to FIG. 1, a machine is shown in which a number of major components combine and cooperate in their operation to bias cut and splice a calendered tire fabric 1. A fabric feeding means shown generally at 2, is provided to receive a roll of tire fabric and measure out predetermined lengths of the fabric to be cut. The fabric feeding means 2 comprises a generally rectangularly shaped, pivotally mounted, framework that is supported to allow limited rotary movement about a vertical axis in order to provide for adjustment of the angle of the bias cut. The fabric feeding means 2 includes a fabric let-off unit, shown generally at 3, which is adapted to receive a roll of calendered tire fabric and unwind it therefrom, and a fabric pull out unit, shown generally at 4, which is adapted to intermittently engage the cut end of the fabric 1 and pull out predetermined lengths of the fabric from the fabric let-off unit 3.

A cutting means, shown generally at 5, which is positioned above the fabric 1, is utilized to intermittently cut the predetermined lengths of fabric into bias-cut, rhombic sections. The bias-cut sections of fabric are each individually lowered onto a conveying means, shown generally at 6, where they are advanced to a splicing means or splice lifting unit, shown generally at 7, which joins the adjacent bias-cut sections of fabric in overlapped end-wise relation to form a continuous strip. From the splicing means 7 the continuous strip of bias cut fabric is advanced to a fabric wind-up means, shown generally at 8 where the fabric is wound up, along with a fabric liner, into rolls which may be stored for future use in the fabrication of tire carcasses.

The fabric let-off unit 3, shown generally in FIG. 1 and in greater detail in FIG. 2, is adapted to receive a roll 9 of calendered fabric, the layers of which are conventionally separated with a fabric liner. A liner roll 10, positioned atop the fabric roll 9 and in engagement therewith, is supported for vertical movement in a guide way 11 to wind up the fabric liner as the tire fabric roll 9 unwinds, in a manner well known to the art.

In order to unwind the fabric 1 from the fabric roll 9, upper and lower pull rolls, 12 and 13, respectively, are provided in driving engagement with each other through upper and lower gears 14 and 15, respectively. Power to turn the pull rolls is provided by a fabric let-off drive motor M–4, which drives the lower pull roll 13 through a drive system composed of belt 17, pulley 18 and belt 19. The fabric 1 is threaded under lower pull roll 13, over upper pull roll 12, and then through a festoon-like fabric support, shown generally at 20, comprised of three stationary rolls 21, 22 and 23, and a vertically reciprocable dancer roll 24. The fabric 1 passes over the stationary roll 21, under the dancer roll 24, over the stationary roll 22, under the stationary roll 23, and then horizontally out of the fabric support 20 along a table 20A to the fabric pull-out unit 4 (FIG. 1).

The dancer roll 24 (FIG. 2) is slidably mounted in a guideway 25 which restricts the dancer roll to movement in a vertical plane. A lower limit switch LS–11, which controls the operation of fabric let-off drive motor M–4, is actuated by the movement of the dancer roll 24 by means of a lower pivotal arm 26. Assuming that drive motor M–4 has just been shut off due to the dancer roll actuating lower limit switch LS–11, and also assuming that the fabric pull-out unit 4 is intermittently withdrawing predetermined lengths of fabric from the fabric support 20, the dancer roll 24 will begin to rise in the guideway 25. When the dancer roll rises sufficiently to disengage lower pivotal arm 26, thereby de-actuating lower limit switch LS–11, drive motor M–4 will again be energized to unwind fabric from the fabric roll 9. This, in turn, will cause the dancer roll 24 to be lowered until it again engages pivotal arm 26 to actuate lower limit switch LS–11 and de-energize the motor M–4. Thus, during operation of the machine, the fabric support 20 is constantly supplied with tire fabric and acts as a reservoir from which the machine draws fabric to be cut. An upper limit switch LS–12 and an upper pivotal arm 27, which is engageable by the dancer roll 24, are utilized to stop the machine in the event that drive motor M–4 fails to properly feed fabric support 20.

In order to allow changes to be made to the bias angle at which the fabric is cut, the fabric feeding means 2 (FIG. 1) is supported for limited angular rotation about a vertical axis located at 28. The vertical axis 28 is, in the preferred form of this invention, positioned at the intersection of the longitudinal axis of the tire fabric 1 with the axis along the line where the cut is made. The fabric feeding means 2 is supported at its let-off unit 3 end by a plurality of wheels 29 (FIG. 2), it being understood that the fabric pull-out unit 4 end of the fabric feeding means 2 will also be supported by a similar arrangement (not shown).

Directing attention to FIG. 1, a bias angle adjusting means, shown generally at 30, is provided for effecting changes in the bias cutting angle. The bias angle adjusting means 30 comprises a base plate 31 rigidly fastened to the floor, a support post 32 vertically supported by the base plate 31 and pivotable with respect thereto, a shaft 33 which is threaded along a portion of its length and passes through a threaded aperture located near the top of support post 32, and a hand wheel 34 connected to the end of shaft 33 for rotating the shaft with respect to the support post 32. The opposite end of shaft 33 is rotatably journaled in a thrust bearing 35 that is carried by the framework of the fabric feeding means 2 so that rotation of the hand wheel 34 results in angular movement of the fabric feeding means 2 about its vertical pivot axis 28, thereby changing the bias-cut angle. A pointer 36 carried by the shaft 33 and a scale 37 carried by the base plate 31 may be used to provide a constant indication of the bias angle to which the machine is set. It will be apparent to those skilled in the art that shaft 33 must include a universal joint (not shown) located near the end thereof which is connected to the fabric let-off unit 3 in order to prevent binding of the shaft 33 in the threaded aperture of support post 32 and consequent difficulty in effecting bias cutting angle changes.

Referring to the fabric pull-out unit 4 portion of FIG. 1, the manner in which predetermined lengths of fabric to be cut are pulled beneath the cutting means 5 will now be described. The pull-out unit 4 comprises a three element carriage track 38, a triangularly shaped clamp carriage 39 movably supported on the carriage track 38, and a fabric clamping means or gripper 40 which is pivotally suspended from the clamp carriage 39 for movement therewith. The triangular clamp carriage 39 is movably supported on rods 38A, 38B, and 38C of the carriage track by means of rollers 41, 42 and 43, respectively, and is composed of a longitudinal rod 44, a transverse rod 45, and a diagonal support plate 46 which supports the fabric clamping means 40.

The details of the fabric clamping means 40 and the manner is which it is supported from the clamp carriage 39 may be more clearly seen by reference now to FIGS. 3 through 8. The fabric clamping means 40 includes (FIG. 4) upper and lower support plates, 47 and 48, respectively, which are rigidly connected together in parallel spaced apart relation by means of vertically disposed channel bars 49 and 49A which may be welded thereto. A shaft 50, rotatably supported from the front end of lower base plate 48 by a plurality of journals 51 (FIG. 8), extends across the entire width of the fabric clamping means 40. A segment gear 52 (FIG. 7) is keyed to one end of the shaft 50 in order to provide for angular rotation of the shaft, and a segment gear 53 (FIG. 3) performs a similar function at the other end of shaft 50. An angular clamping bar 54, which is rotatably supported in right and left hand end blocks 55 and 56, respectively, and includes stub end portions which projects outwardly beyond the end blocks, is provided at its ends with pinion gears 57 and 58 which mesh with the segment gears 52 and 53, respectively, to cause rotation of the shaft 50 when the angular clamping bar 54 is rotated. The clamping bar 54 is equipped with slotted spring clips 59 positioned at regular intervals across its lower face and with spring loaded pins 59A which coincide with the spring clips 59. When the angular clamping bar 54 is rotated to the position shown in FIG. 4, the leading edge of the fabric (not shown) may be resiliently clamped between the bar 54 and the rotatable shaft 50 to grip the fabric in order to pull a predetermined width of fabric beneath the cutting means 5 by movement of the clamp carriage 39 away from the cutting means.

In order to rotate the angular clamping bar 54 and thereby grip the leading edge of fabric, a power cylinder 60 (FIG. 4) is provided. The cylinder 60 is pivotally supported by a vertical plate 61 which is rigidly connected to an extension plate 62 that is fastened to the base plate 48. A pair of side walls 63 and 63A provide rigidity for the supporting structure of the power cylinder 60. The power cylinder 60 actuates angular clamping bar 54 through a linkage arrangement comprising piston rod 64, clevis 65, a pin 66, and a link 57 which is rotatably fastened to the pin 66 and rigidly connected to the clamping bar 54. The action of the power cylinder 60 is controlled by a solenoid valve SV-2 (FIG. 16) hereinafter to be described.

The pivotal supporting arrangement by means of which the fabric clamping means 40 is supported from the diagonal plate 46 of the clamp carriage 39 is illustrated with particularity in FIGS. 3 and 4. The upper base plate 47 of the clamping means 40 is held closely adjacent to the diagonal plate 46 of the clamp carriage 39 by means of a spring-loaded center bolt 68 and two spring-loaded side bolts 69 and 70, all of which pass through both plates. The center bolt 68 acts as a pivot about which the fabric clamping means 40 may rotate with respect to the diagonal plate 46. Arc-shaped slots 71 and 72, which are cut through the diagonal plate 46, cooperate with the side bolts 69 and 70, respectively, to allow limited pivotal movement of the fabric clamping means 40.

It may be noted (FIG. 1) that when changes in the bias-cut angle are made by rotating the fabric feeding means 2 with respect to the fabric cutting means 5, re-alignment of the fabric clamping means 40 with respect to the cutting means 5 is required. This is accomplished (FIG. 3) by providing bumpers 73 and 74 on end plates 55 and 56, respectively. The bumpers 73 and 74 are arranged to engage stop blocks 75 and 76 which are carried by the supporting framework of the fabric cutting means 5. After a change is made in the setting of the bias cutting angle, movement of the clamp carriage 39 toward the cutting means 5 will result in one or the other bumpers 73 and 74 in engaging its respective stop block 75 or 76 and this, in turn, will cause the fabric clamping means 40 to realign with the new bias cutting angle upon further movement of the clamp carriage 39 towards the fabric cutting means 5. Preloading the springs of spring loaded bolts 68, 69 and 70 to a value of approximately 180 pounds has been found to be satisfactory to achieve both stable normal operation and accurate re-alignment when changes in the bias cutting angle have been made. As a further measure for providing stability and rigidity to the fabric clamping means 40 support arrangement, the diagonal plate 46 of the clamp carriage 39 is provided with a raised flange 77 about its periphery.

In order to insure that the fabric clamping means 40 is properly aligned with the leading edge of the fabric prior to actuating the power cylinder 60 to grip the fabric end, electrical contacts are provided on each of the bumpers 73 and 74 which cooperate with contacts located on each of the stop blocks 75 and 76 carried by the cutting means 5. Contact 78, carried by bumper 73 engages contact 79, carried by stop block 75 and, similarly, contact 80, carried by bumper 74, engages contact 81, carried by stop block 76, when the fabric clamping means 40 is aligned parallel to and in abutment with the fabric cutting means 5 to ground out a low voltage control circuit. A limit switch LS-3 (FIG. 6), which is actuated by the opening of the angular clamping bar 54, and a limit switch LS-4 (FIG. 5), which is actuated by the closing of angular clamping bar 54, are utilized in conjunction with contacts 78 through 81 to provide proper sequencing of the operation of the fabric clamping means 40 and the clamp carriage 39. The details of the circuitry by which this is accomplished will be brought out more fully hereinafter under the headings of Pneumatic-Hydraulic Control System and Electrical Control System.

Returning now to FIG. 1, it may be seen that the triangular clamp carriage 39 is moved along the clamp carriage track 38 by the operation of a power cylinder 82. The cylinder 82 is used to move the carriage forward to a "fabric clamping position" at which the fabric is gripped by the clamping means 40 and to retract the carriage rearwardly to a "fabric cutting position" at which the fabric is pulled out beneath the cutting means 5 and is ready to be cut. The action of the power cylinder 82 is controlled by a solenoid valve SV-1 (FIG. 16) discussed hereinafter under the headings of Pneumatic-Hydraulic Control System and Electrical Control System.

To insure that the cut pieces of fabric will be of a uniform width and that the cut will be parallel to the pulled fabric edge, stop contacts, 83 and 84, are provided (FIG.

1) in spaced apart relation along transverse rod 45 of the clamp carriage 39. These contacts cooperate with stop contacts 85 and 86 which are supported by the stationary framework of the fabric pull-out unit 4. Contacts 83 through 86 are also utilized in the electrical system of the machine and they sense the arrival of the clamp carriage 39 at the fabric cutting position in a manner which will be discussed hereinafter under the headings of Pneumatic-Hydraulic Control System and Electrical Control System.

A manually operated mechanical adjustment for changing the width of the cut sections of fabric is provided by changing the longitudinal position of contacts 85 and 86. As indicated in FIG. 1, stop contacts 85 and 86 are mounted on cylinders 87 and 88, respectively. The cylinders, in turn, are supported in vertical mounting brackets 89 and 90 by means of shafts 91 and 92, respectively, which pass through splined apertures formed in the vertical mounting brackets that prevent relative rotation from occurring between the shafts and the brackets but allow longitudinal movement to occur therebetween. The cylinders 87 and 88 are mounted upon one end of the shafts 91 and 92, respectively, and the other ends of the shafts are in threaded engagement with pulleys 93 and 94, respectively, so that simultaneous rotation of the pulleys 93 and 94 will result in equal longitudinal movement of the shafts 91 and 92. Similarly, the stop contact carrying cylinders 87 and 88 will be equally moved to re-position the stopping point of the clamp carriage 39 in the fabric cutting position. Movement of the pulleys 93 and 94 is effected by means of a hand wheel 95 which carries a double pulley 96. Belts 97 and 98 connect the double pulley to the single pulleys 93 and 94, respectively, to effect simultaneous rotation of the two pulleys and consequent uniform changes to the widths of the sections of fabric to be cut.

Figure 12:
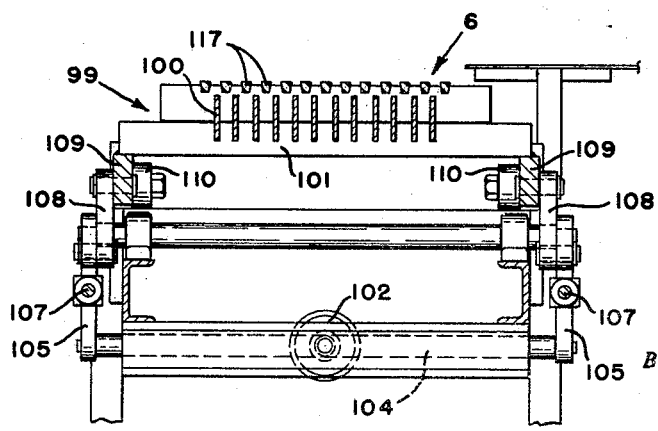

Assuming that the clamp carriage 39 has been retracted to the fabric cutting position, thereby closing contacts 83 through 86 to ground out the low voltage circuit, platform means, shown generally at 99 in FIG. 1 and in greater detail in FIGS. 9 and 12, will be raised into contact with the extended piece of fabric, support it during the cutting stroke, and lower the bias-cut section of fabric on to the conveying means 6 after the fabric has been released by the fabric clamping means 40. Referring to FIGS. 9 and 12 the platform means 99 comprises a plurality of vertical plate members 100 which are interspersed between adjacent belts of the conveying means 6 and are connected together by cross plates 101 so that the vertical plates may be simultaneously moved from a position below the conveying means 6 to a position above the conveying means as shown by the dotted lines of FIG. 9. The vertical plates 100 are moved between their lower and upper position by a power cylinder 102 that is mounted upon the framework of the conveying means 6. A piston rod 103, which is actuated by power cylinder 102, is connected to a cross shaft 104, which extends transversely across the entire width of the platform means 99. Bell cranks 105 and 106, are pivotally mounted to the framework of the conveying means 6 and are connected together by a rod 107, which provides for converting the horizontal movement of the piston rod 103 into a vertical movement of the platform means 99. The lower arm of bell crank 105 is connected to and actuated by cross shaft 104, while the upper arms of each of the bell cranks 105 and 106 are connected to links 108 that are suspended from a longitudinal support member 109 upon which the cross plates 101 are mounted. Rollers 110, which are carried at either end of the longitudinal support member 109, cooperate with guide ways 111, that are mounted upon the framework of the conveying means 6, to provide a crosshead action which limits movement of the vertical plate members 100 only to vertical reciprocation. The linkages just described, and shown in FIG. 9, are duplicated on both sides of the conveying means 6, as shown in FIG. 12.

Actuation of the power cylinder 102 to raise and lower the platform means 99 is accomplished via a solenoid valve, SV-3 (FIG. 16). In addition, the position of the platform means 99 is electrically determined for subsequent automatic operations by limit switches LS-1 and LS-2, LS-1 being actuated when the platform means 99 is in its lower position and LS-2 being actuated when the platform means is in its upper position. As before, the operation of the foregoing solenoids and limit switches will be discussed hereinafter under the headings of Pneumatic-Hydraulic Control System and Electrical Control System.

Assuming that the fabric pull-out unit 4 has positioned a length of fabric to be cut beneath the cutting means 5, and that the platform means 99 has been raised to support the extended section of fabric above the conveying means 6, the cutting means 5 will then be actuated by limit switch LS-2 to initiate a cutting stroke that will cut the extended length of fabric into a bias-cut section. The cutting means 5 (FIG. 1) may be of any conventional type, such as a Banner cutter, that may be driven angularly across the width of the fabric in a cutting stroke to a completion of cut position, and then driven back along the same path in a return stroke to a cutter starting position. The cutting means utilized in the present invention includes a rotary cutter blade 112, a cutter blade drive motor M-1 for rotating the blade 112, a horizontally movable cutter carriage 114 upon which the motor M-1 and blade 112 are supported to move therewith through the cutting stroke and the return stroke, a cutter carriage track 115 which extends angularly across the width of the fabric to be cut and upon which the cutter carriage 114 moves, and a cutter carriage drive motor M-2 which is drivingly connected to the cutter carriage 114 by means of, for example, an endless link chain to drive the cutter carriage through the cutting stroke and the return stroke.

The various positions of the cutter carriage 114 along the cutter carriage track 115 are sensed by three limit switches which, in turn, control certain automatic functions of the machine. Limit switch LS-5 is provided near the left hand end of the cutter carriage track 115 and is actuated by the cutter carriage 114 when the carriage is at the left hand side of the track, in position to start a cutting stroke. Limit switch LS-6 is provided on carriage track 115 adjacent to limit switch LS-5 but further along the path of the cutting stroke. It is actuated prior to limit switch LS-5 on the return stroke of the cutter carriage 114 and serves to remove power from the cutter carriage drive motor M-2 to insure that the cutter carriage 114 will stop at limit switch LS-5 on the return stroke and, therefore, be in position to start a subsequent new, cutting stroke. Limit switch LS-7 is provided near the right hand end of the cutter carriage track 115 and is actuated by the cutter carriage 114 when the carriage is at the right hand side of the track at the completion of the cutting stroke. The manner in which limit switches LS-5, LS-6 and LS-7 cooperate with the remainder of the electrical components of the machine to assist in the automatic control thereof will be discussed hereinafter under the heading of Electrical Control System.

Assuming that limit switch LS-7 has just been actuated at the completion of a cutting stroke, motor M-2 will be reversed to drive the cutter carriage 114 to the start position, and, concurrently with this, the fabric clamping means 40 will be actuated to release the cut section of fabric. Releasing of the cut section of fabric is brought about by the energization of "open clamping means" solenoid SV-2B (FIG. 16), under the action of limit switch LS-7, and takes place as follows. When "open clamping means" solenoid SV-2B is energized, it reverses the application of power to the piston rod of power cylinder 60 of the fabric clamping means 40 to rotate both the angular clamping bar 54 and the shaft 50 to an open position, thereby releasing the clamped edge of the cut section of fabric and breaking the tacky connection of the fabric with the shaft 50 (FIGS. 4 and 7). When the angular clamping bar 54 is opened, limit switch LS-3 (FIG. 6) is actuated to initiate the next step in the sequential operation of the machine-movement of the clamp carriage 39 to a "fabric clear" position.

In order both to completely release the cut section of fabric from the clamping means 40 and to insure that successive cut sections of fabric will be lowered by the platform means 99 onto the conveying means 6 in accurate alignment with each other, the clamping carriage 39 is retracted an additional small amount from the fabric cutting position to the fabric clear position at which the cut section of fabric is entirely supported by the platform means 99. The actuation of limit switch LS-3 results in energization of the "clamp carriage to clear position" solenoid of solenoid valve SV-4 (FIG. 16) which, in turn, causes the piston rods and stop contacts of cylinders 87 and 88 (FIG. 1) to retract, thereby opening low voltage stop contacts 83-85 and 84-86 carried by the clamp carriage 39 and the piston rods. The opening of the low voltage contacts plus the repositioning of the stops or piston rods, in turn allows the clamp carriage 39 to move to the fabric clear position. The amount of additional movement involved may be in the order of one inch, which is sufficient to clear the cut section of fabric.

After the additional travel of approximately one inch of clamp carriage 39 to the fabric clear position is completed, and the fabric is supported solely by the platform means 99, a limit switch LS-8 (FIG. 1), carried by the framework of the fabric pull-out unit 4 is actuated by the clamp carriage 39. The actuation of limit switch LS-8 in turn, results in the initiation of subsequent sequential operations of the machine.

Upon actuation of limit switch LS-8, "lower platform means" solenoid SV-3B (FIG. 16) of solenoid valve SV-3 becomes energized and this, in turn reverses the action of power cylinder 102 (FIG 9) to lower the platform means 99, thereby placing the cut section of fabric on the conveying means 6. Concurrently with the lowering of the platform means 99, limit switch LS-1 is actuated and causes operation of the conveying means 6, at high speed, to remove the cut section of fabric from the area of the cutting means 5. The manner in which the electrical circuitry controls the foregoing operations will be described hereinafter under the heading of Electrical Control System.

The conveying means 6 (FIG. 1) is located adjacent to and at a lower level than the cutting means 5 and is structurally supported by the framework of the machine in parallel alignment with the cutting means. It extends longitudinally beyond the cutting means 5 to the splicing means 7, the length of the conveying means 6 being sufficient to carry at least two cut sections of fabric thereon so that the cutting means 5 may recycle to cut a succeeding section of fabric while a preceding section of fabric is being processed by the splicing means 7. The conveying means 6 comprises a plurality of horizontally disposed endless belts 117 which are supported in laterally spaced apart relation at one end of the conveying means 6 by an idling roller 118 and at the other end by a driving roller 119. A conveyor drive motor M-3, having a high speed winding and a low speed winding, is utilized to power the endless belts 117 by means of a belt and pulley system 121 and the driving roller 119. The two speed conveyor drive motor M-3 is utilized in order to provide for high speed removal of cut sections of fabric from the area of the cutting means 5 so that rapid recycling may occur, and, yet, allow low or "crawling" speed for positioning the cut sections of fabric at the splicing means 7 to insure accuracy in overlapping when effecting a splice between the adjacent cut sections of fabric.

Control over the speed of the conveyor drive motor M-3 is achieved by sensing means, shown generally at 122 in FIGS. 1 and 10. The sensing means 122 is positioned along the longitudinal axis of the conveying means 6, just prior to the splicing means 7 and comprises first and second photoelectric cell operated relays PER-1 and PER-2, respectively. The light source of each of the photoelectric relays is located below the endless belts 117 and the photo-cell of each is positioned above the endless belts so that the movement of a cut section of fabric along the conveying means 6 will cause the light source to be blocked out as a cut section of fabric passes thereby. The circuit connections of the photoelectric relays PER-1 and PER-2 are such that, upon initially starting the machine and while the splicing means 7 is lowered, the first cut section of fabric will be carried by the conveying means 6 to, and past, both photoelectric relays at high speed. When the photocell of the first photoelectric relay PER-1 becomes uncovered by the trailing edge of the first cut section of fabric, the conveyor drive motor M-3 will be slowed down to a "crawling" speed, and, upon subsequent uncovering of the photo-cell of the second photoelectric relay PER-2, the conveyor drive motor M-3 will stop the endless belts 117. Thus, the first cut section of fabric may be positioned above the splicing means 7 in order to prepare the machine for the splicing operation that occurs next.

It should be pointed out at this time that, simultaneously with the commencement of high speed movement of the conveying means 6, recycling of the fabric pull-out unit 4 is initiated and this is followed by subsequent cutting of a second section of fabric.

The splicing means or splice lifting unit 7, the details of which are shown in FIGS. 10, 11 and 13, is located at the delivery end of the conveying means 6 adjacent to the conveyor driving roller 119. It includes a mechanical splice lifting unit comprised of a plurality of vertically disposed plates 123 interposed between the endless belts 117 of the conveyor. The plates 123 are adjustably connected to a diagonal support member 124, which, in turn, is pivotally mounted at one end on a reciprocable side plate 125 (FIG. 11). On the opposite side of the splicing means 7, a second reciprocable side plate 126 supports the movable end 127 of the diagonal support member 124. A pin 128 is carried by the movable end 127 of the diagonal support member 124 and projects downwardly therefrom to engage inclined camming blocks 129 (FIG. 10), which are suitably supported for longitudinal movement in a direction parallel to the conveying means 6 in a guide way 130. The movement of the inclined blocks 129 with respect to the guide way 130 is controlled by a pull rod 131 that connects the inclined blocks 129 with the framework of the fabric feeding means 2 (FIG. 1) so that when changes are made in the bias cutting angle, by rotating the fabric feeding means 2 with respect to the fabric cutting means 5, they result in realignment of the diagonal support member 124 with respect to the leading and trailing edges of subsequently cut sections of fabric.

In order both to compensate for angular movement of the diagonal support member 124 and to properly align the leading edges of the vertically disposed plates 123 with the edges of the cut sections of fabric, the plates 123 are slidably mounted at one end in grooves of a cross member 132 which also serves to support the side plates 125 and 126. Each of the vertically disposed plates 123 carry pins 133 projecting downwardly at their other ends into a slot 134 formed in the diagonal support member 124. Thus, when angular changes are made in the position of the diagonal support member 124, they result in lateral repositioning of the vertical plates 123 with respect to the slot 134 and longitudinal repositioning of the vertical plates 123 with respect to the grooves of cross member 132. The cross member 132 is suitably connected to and supported by side support members 135 and 136 which, in turn, are pivotally mounted at 138 to the stationary framework 137 of the splicing means 7.

Pivotal vertical movement of the splice lifting unit 7 about the pivot point 138 is accomplished by means of a power cylinder 139 which is carried by the stationary framework 140 of the machine (FIGS. 10 and 13). A piston rod 141, which is movable within the power cylinder 139, is connected to an arm 142 that rotates a cross shaft 143 to which the arm 142 is keyed, it being understood that the cross shaft 143 is mounted in bearings on the framework of the machine. Links 144 and 145 (FIG. 13), each of which has one of its ends rigidly secured to a different end of the cross shaft 143 and its other end pivotally connected to the ends of links 146 and 147, respectively, are moved by rotation of the cross shaft 143 under the action of the power cylinder 139. The opposite ends of links 146 and 147 are pivotally connected to side plates 126 and 125, respectively, so that actuation of the power cylinder 139 results in vertical movement of the diagonal support member 124 and the vertically disposed plates 123 between a position at which the vertical plates 123 are disposed below the level of the endless belts 117 and a position at which the vertical plates 123 are disposed above the level of the endless belts 117. This movement, in turn, will carry a cut section of fabric that may be located on the endless belts 117 above the splice lifting unit 7 to a position above the endless belts 117 so that a succeeding cut section of fabric may be moved therebeneath into overlapped relation with the preceding cut section of fabric.

In order to maintain proper control over the lifting of splicing means 7, lower and upper limit switches LS–9 and LS–10, respectively, are provided. Limit switch LS–9 is actuated when the splicing means 7 is in its lower position and limit switch LS–10 is actuated when the splicing means 7 is in its raised position. The limit switches cooperate with the photoelectric relays PER–1, PER–2 and other circuit components, to initiate the raising of the splice lifting unit 7, control the entry of a succeeding cut section of fabric beneath the trailing edge of a preceding cut section of fabric by a desired amount of overlap, and lower the splice lifting unit 7. In this manner the tacky surface at the trailing edge of the preceding cut section of calendered fabric comes into contact with the tacky surface at the leading edge of the succeeding cut section of calendered fabric to thereby effect a splice between the two sections. The particular control arrangement and circuitry utilized will be discussed in greater detail under the heading entitled Electrical Control System.

Upon completion of the splice between two cut sections of fabric due to the lowering of the splicing means 7, the conveyor drive motor M–3 is re-energized at high speed to move the spliced sections of fabric from the splicing means 7 to the fabric wind-up means 8. It will be remembered that during the splicing operation the cutting means 5 had been reloaded with a third section of fabric to be cut and the third section of fabric, at this time, will have been cut and placed on the conveying means 6 ready to be moved to the splicing means 7. Thus, as the conveying means 6 operates at high speed to remove the first two spliced sections of fabric, a third section of fabric will also be brought to the area of the splicing means 7 to be connected to the trailing edge of the second section of fabric. Similarly, the cutting means 5 will be reloaded with still another section of fabric to be cut when the third section of fabric is removed from the area of the cutting means 5 at high speed.

Concurrently with the lowering of the splice lifting unit 7 and the starting up of the conveying means 6 at high speed, a magnetic clutch 148 (FIG. 11) becomes energized to couple driving power from the conveyor drive motor M–3, through the belt and pulley drive arrangement 121, a shaft 149, a belt and pulley arrangement 150, and the previously mentioned magnetic clutch 148 to drive a fabric wind-up conveyor 151. The fabric wind-up conveyor 151, in turn, carries the spliced sections of bias cut fabric to the fabric wind-up means 8 and is itself a part of the fabric wind-up means.

The splicing means 7 may also be provided with a weighted pressure or stitcher roller 162 which is pivotally supported from the side support members 135 and 136 through shaft 163 and movable arms 164 and 165. The weighted roller 162 may be located above the spliced bias-cut fabric on the conveying means 6 and gravity actuated downwardly so that when the fabric passes from the splicing means 7 to the fabric wind-up means 8 the overlapped edges of the spliced joint will be pressed firmly together in order to enhance the joint therebetween.

Referring now to FIG. 14, the fabric wind-up means 8 is equipped with first and second fabric wind-up units, shown generally at 152 and 153, respectively. Each of the wind-up units includes a partially counter-balanced, pivotally mounted, arm 154 that is supported from the stationary framework of the machine 155. A fabric windup roll 156 is rotatably supported at one end of the counter-balanced arm 154 and a counter-balance weight 157 is rigidly supported at the other end of the counter-balanced arm 154. A fabric liner roll 158, which is rotatably supported at the pivotal connection between the counter-balanced arm 154 and the stationary framework 155, is provided to dispense a fabric liner to the fabric wind-up roll 156, which is surface driven by the belt through the fabric and liner. The liner may be wound up along with the bias-cut fabric to prevent sticking between adjacent layers of the fabric on wind-up roll 156. A power cylinder 159 is utilized to move the arm 154 vertically, by means of a piston rod 160, in order to afford both removal of a roll of wound up fabric and to allow the lowering of a new wind-up roll onto the conveyor belt 151. Idler rolls 161 are positioned beneath the wind-up conveyor 151 at the approximate points of contact between the fabric wind-up rolls 156 and the conveyor belt 151 in order to support the conveyor belt at these points.

Referring to FIGS. 17 through 22, there is illustrated a modified fabric wind-up arrangement wherein a removable cartridge type servicer is utilized. A stationary fixture shown generally at 166, which is adapted to receive a removable cartridge storage unit 167, is provided near the delivery end of wind-up conveyor 151. The removable cartridge storage unit 167 (FIG. 20) has rotatably mounted therein a fabric wind-up roll 168, a fabric liner roll 169, a rubber covered drive roll 170 and a snubber roll 171. The spliced continuous strip of bias-cut fabric, now identified as 172, is carried by the wind-up conveyor 151 into the removable cartridge storage unit 167 and beneath both the fabric liner roll 169 and the snubber roll 171. A fabric liner 173 unwinds from the fabric liner roll 169, passes over the snubber roll 171, and between the snubber roll 171 and the adjacent rubber covered drive roll 170 to be brought into contact with the fabric 172 at a point below the rubber covered drive roll 170. From this point on, both the liner 173 and the fabric 172 proceed together about the drive roll 170 to be wound onto the fabric wind-up roll 168.

In order to avoid stretching of the bias-cut fabric 172 a frictional drag torque is applied to the fabric liner roll 169 and a constant driving torque is applied to the fabric wind-up roll 168 at all times while the machine is in operation so that any tensile stresses that are due either to the winding up of the fabric on the fabric wind-up roll 168 or to the intermittent driving of the rubber covered drive roll 170 may be absorbed by the fabric liner 173 rather than by the bias-cut fabric 172.

Referring to FIG. 19, there has been illustrated the manner in which the fabric wind-up roll 168 is driven at a constant torque. The stationary fixture 166 carries an hydraulically driven constant torque motor 174 which, in turn, supplies power through a fixed gear 175 and a movable gear 176 to the wind-up roll 168. The movable gear 176 carries a pair of protruding pins 177 which are selectively engageable with an apertured flange 178 carried by the fabric wind-up roll 168. A power cylinder 179, which is supported by the stationary fixture 166, and, in turn, supports the movable gear 176, is utilized to selectively couple the pins 177 with the flange 178 during normal operation of the machine.

In a like manner, the fabric liner roll 169 (FIG. 22) may have a frictional torque applied thereto. A friction brake 180, having a fixed gear 181 attached thereto, is supported by the stationary fixture 166. A movable gear 182, which carries protruding pins 183 therewith, is selectively engageable with an apertured flange 184 that is, in turn, carried by the fabric liner roll 169. Again, a power cylinder 185 may be utilized to selectively move the movable gear 182 so that its protruding pins 183 engage the apertures in flange 184. Thus rotary movement of the fabric liner roll 169 may be inhibited by the snubbing action of friction brake 180 when the power cylinder 185 is actuated.

Similarly, the power source for the rubber covered drive roll 170 (FIG. 21) may be selectively applied by virtue of the apertured flange 186, pins 187, movable gear 188 and power cylinder 189. In this case, however, the rubber covered drive roll is only required to be driven intermittently when the wind-up conveyor 151 is operating to advance spliced sections of bias-cut fabric 172. Driving power for the rubber covered drive roll 170, consequently, is derived from the wind-up conveyor 151 by means of a sprocket and chain belt drive 190 which is driven by the delivery end roller 191 of the wind-up conveyor 151. The sprocket and chain belt drive arrangement 190 drives a shaft 192 which, in turn, carries a fixed gear 193 that is in engagement with movable gear 188. Thus, each time that the wind-up conveyor 151 is driven, the rubber covered drive roll 170 will operate to advance both the liner and fabric to the wind-up roll 168 so long as the power cylinders 179, 185 and 189 are actuated.

It is apparent from the foregoing discussion that the torque generated by the hydraulic motor 174 (FIG. 19) places tension on the fabric liner 173 (FIG. 20) when the wind-up roll 168 is stopped. This is due both to the snubbing action of the snubber roll 171 which presses the fabric liner 173 against the stopped drive roll 170 and to the friction brake 180 (FIG. 22) acting on the fabric liner roll 169. These forces are not present in the fabric 172 since the fabric passes loosely over the drive roll 170. In a similar manner, the snubbing roll 171 and the friction brake 180 cooperate to relieve the fabric 172 of tension when the wind-up conveyor 151 and driving roll 170 are operating to wind-up the bias-cut fabric.

In order to provide for accurate alignment between the longitudinal axis of the removable cartridge storage unit 167 and the longitudinal axis of the bias-cut fabric 172, which alignment shifts when changes are made in the width of the bias-cut sections, means are provided for transversely adjusting the position of the cartridge storage unit 167 with respect to the wind-up conveyor 151. The transverse adjusting means is shown in detail in FIGS. 18, 20 and 22 and comprises a pair of cross rods 194 upon which the stationary fixture 166 is slidably mounted by means of apertured depending lugs 194a. The cross rods 194 are mounted on blocks 195 (FIG. 18) which are supported by the stationary framework 196 of the machine. A second set of depending lugs 197, having a threaded aperture which cooperates with a threaded shaft 198, is provided on the stationary fixture 166. The shaft 198 is journaled in the stationary framework 196 of the machine and is provided with a hand wheel 199 that may be manually rotated to effect lateral movement of the depending lugs 197 with respect to the shaft 198. Thus, rotation of the hand wheel 197 results in transverse movement of the stationary fixture 166 which, in turn, results in re-alignment of the cartridge storage unit 167 with respect to the bias-cut fabric 172.

A modified splicing means for effecting a splice between adjacent bias-cut sections of fabric has been illustrated in FIGS. 24 through 27. In this modification the use of a pressure or stitcher roll 162 (FIG. 11), which causes a creeping of the material that results in uneven splices in some bias-cut fabrics, is obviated. In place of the stitcher roller 162, a pressurized fluid is used to force the overlapped edges of the two sections of bias-cut fabric together. Additionally, a vacuum is utilized to create a suction to assist the splicing means 7 in lifting the trailing edge of a previously cut section of fabric so that the leading edge of a subsequent section may be properly located for splicing.

Referring to FIGS. 24 through 27, the modified splicing means, shown generally at 200, has been illustrated as an addition to the previously described splicing means 7. The splice lifting unit 7 may be conveniently termed a physical splice lifter in contradistinction to the added splicing means 200, which may be termed a vacuum splice lifter. Side plates 125 and 126 of the physical splice lifter 7 have been extended to accommodate elevated contact plates 201 and 202 (FIG. 25) which assist in raising the vacuum splicing means 200 when the physical splicing means 7 is raised. The vacuum splicing means 200 is suspended from a cross member 203 by means of a diagonal cross member 204 which is pivotally connected to the cross member 203 at pivot point 205. This arrangement serves to support the vacuum splicing means 200 in such a manner that the angular relationship of the vacuum splicing means 200 to the leading edge of the cut sections of fabric may be changed to correspond with changes that may be made in the bias-cutting angle.

The cross member 203 is, in turn, rigidly mounted on side framework members 206 and 207 of the machine to support the entire assembly. A manifold 208, which is adapted to be either evacuated or pressurized by means of a conduit 209 connected thereto, is supported for reciprocable motion from the diagonal cross member 204 by means of power cylinders 210 and 211, one of which is located at each end of the manifold 208. Power cylinder 210 (FIG. 26) is supported from diagonal cross member 204 by means of a bracket 212. It, in turn, pivotally supports one end of the manifold 208 by means of a clevis 213, which is carried by the piston rod of the power cylinder 210, and a pin 214 that is rigidly connected to the manifold 208. A slotted plate 215, projecting upwardly from the manifold 208, cooperates with a pair of guide lugs 216 which are fixed to the bracket 212 to provide a guide way which insures that the manifold 208 will move in a vertical plane when the power cylinder 210 is actuated.

Similarly, power cylinder 211 (FIGS. 25 and 27) is rigidly supported from the diagonal cross member 204 by means of a support arrangement including a bracket 217, a crosshead guide 220, and a second bracket 221. The piston rod of power cylinder 211 supports the other end of the manifold 208 through a slidable crosshead 218 which is pivotally connected to a link 219 that protrudes upwardly from the manifold 208.

In order to insure that the power cylinder 211 end of the manifold 208 will also move in a vertical plane only, crosshead guide 220 is engaged by four rollers 222 that are carried by the crosshead 218. The four rollers 222 are arranged into two vertically spaced pairs, with each pair having one roller disposed on each side of the crosshead guide 220. The vertical spacing between the two pairs of rollers 222 prevents the crosshead 218 from tilting during normal operation of the two power cylinders and insures that the manifold will reciprocate properly. The pivotal connections between line 219 and crosshead 218 and between the piston rod of power cylinder 210 and pin 214 are provided in order to allow the manifold to tilt should one of the power cylinders fail to operate properly, thereby avoiding bending or failure of the manifold support structure.

The lower wall of manifold 208 is provided with a plurality of apertures 223 which allow the condition of manifold 208 to be felt beneath the lower wall. Thus, if manifold 208 is under a vacuum, air will rush through apertures 223 into the manifold, thereby creating a lower than atmospheric pressure area beneath the manifold. Similarly, if the manifold 208 is under pressure, air will flow out of the apertures 223 to create a high pressure area beneath the manifold. Movable left and right hand end walls 224 and 225, respectively, are provided within the manifold 208 to vary the number of apertures 223 that are in communication with the interior of manifold 208 in accordance with the width of the bias-cut sections of fabric being spliced. End walls 224 and 225 are each provided with a central threaded opening which cooperates with a central shaft 226. The left-hand end of shaft 226 is conventionally threaded whereas the right-hand end of shaft 226 is reversely threaded so that rotation of shaft 226 in one direction will result in movement of the end walls 224 and 225 towards each other, and rotation of the shaft 226 in an opposite direction will result in movement of the end walls 224 and 225 away from each other. Movement of the end walls either toward or away from each other changes the width of the chamber formed between the end walls 224 and 225 and the remaining manifold walls, and, effectively, either adds or subtracts apertures 223 from communication with the conduit 209 that evacuates or pressurizes the manifold. A hand wheel 227, which is geared to the shaft 226 by means of bevel gears 228 and 229, is utilized to initiate movement of the end plates 224 and 225, respectively. Thus, the effective width of the manifold 208 may be adjusted by hand wheel 227 to compensate for changes which may be made to the width of the bias-cut sections of fabric.

In order to assist power cylinders 210 and 211 in raising the manifold 208 when it is desired to effect an overlapped splice, rubber tipped bumpers 230 and 231 are fastened to opposite ends of the manifold 208. The rubber tipped bumpers 230 and 231 cooperate with the elevated contact plates 201 and 202, respectively, so that when both the manifold 208 and the physical splice lifter 7 are in their lowered position, the bumpers will be in engagement with the contact plates. Upon raising the physical splice lifter 7 at this time, the manifold 208 will then be physically lifted and may be held up by power cylinders 210 and 211.

Limit-switches 232 and 233, which are actuated by a ribbed arm 234 projecting upwardly from the manifold 208, may be utilized in conjunction with limit switches LS–9 and LS–10 (FIG. 10) to control both the movement of the manifold 208 and the flow of air through the conduit 209 during the splicing operation. Additionally, first and second photoelectric cells 235 and 236, respectively (FIG. 24), which perform a similar function to photoelectrically operated relays PER–1 and PER–2 of FIG. 10, may be utilized to control both the movement of cut sections of fabric on the conveying means 6 and the operation of the splicing means 7 and 200.

The sequence of operation of the vacuum splicing means 200 may be set forth as follows: Assuming that a previously cut and spliced section of fabric 237 (FIG. 25) is moving along the endless belts 117 of the conveyor to the fabric wind-up means 8, that the physical splicing means 7 is down, and that the vacuum splicing means 200 is raised from a previous splicing action, when the trailing edge of the cut section of fabric 237 uncovers the second photoelectric cell 236 the endless belts 117 will stop and pressure to cylinders 210 and 211 will be released to lower the manifold 208 into close proximity with the trailing edge of the fabric 237. As the manifold 208 is lowered, a vacuum is developed therein by means of the conduit 209. When manifold 208 reaches its lowered position, limit-switch 233 is actuated and, in turn, results in pressurizing of power cylinders 210 and 211 to commence raising both the manifold and the fabric clinging thereto due to the vacuum. Simultaneously with the reactuation of power cylinders 210 and 211, the physical splicing means 7 is actuated and contact plates 201 and 202 engage rubber tipped bumpers 230 and 231, respectively, to assist the power cylinders 210 and 211 in raising the trailing edge of the cut section of fabric 237. Additionally, the vertically disposed plates 123 of the physical splicing means 7 engage the lower surface of the remainder of the cut section of fabric 237 to raise it clear of the endless belts 117. At the end of the upward movement of both the vacuum splicing means 200 and the physical splicing means 7, limit-switch 232 and limit switch LS–10 (FIG. 10) function to bring a succeeding bias-cut section of fabric towards the splicing means 7. When the succeeding cut section of fabric passes the photoelectric cells 235 and 236, the endless belts 117 are first slowed down and then stopped with the leading edge of the succeeding cut section of fabric overlapped by and beneath the trailing edge of the preceding cut section of fabric. Concurrently with the stopping of the succeeding cut section of fabric on the endless belts 117, the physical splicing means 7 is lowered to press the overlapped fabric together between the belt 117 and the vacuum box 208 to effect a splice. Also, the air flow direction is reversed through conduit 209 to provide pressure for releasing the normally tacky fabric from the surface of the vacuum box 208. Thus, the disadvantages attendant when using a pressure or stitcher roller to effect a splice can be avoided.

Pneumatic-hydraulic control system

The manner in which each of the various power cylinders that are utilized in the bias-cutting and splicing machine is actuated may be more easily understood by reference now to FIG. 16. In order to preserve clarity the various major components of the machine have been illustrated by broken lines in their approximate relationship to each other in this figure. Thus, the area enclosed by the broken line indicated by the arrow 2 represents the general arrangement of the fabric feeding means 2. Similarly, the area enclosed by the broken line designated by the arrow 6 corresponds generally to the location of the conveying means 6 of the machine. Likewise, the splicing means 7 is located generally by the broken line designated by the arrow 7. Since the fabric clamp carriage 39 and the fabric clamping means 40 are moved simultaneously under the action of power cylinder 82, the same enclosed area is utilized to indicate both, it being understood that the power cylinder 60, which actuates the fabric clamping means 40, is carried along with the clamp carriage 39 when the clamp carriage is actuated by power cylinder 82. The dotted line indicated by the arrow 99 represents the platform means 99 which is raised to support the fabric to be cut during the cutting stroke and then is lowered to place the cut section of fabric on the conveying means 6.

Power cylinder 82, which is used to move the clamp carriage 39 forward for gripping the fabric and rearwardly for pulling the fabric out for cutting, is controlled by solenoid valve SV–1 through its "clamp carriage to clamping position" solenoid SV–1A and its "clamp carriage to cutting position" solenoid SV–1B. Pneumatic pressure fluid is brought to the pneumatic-hydraulic control system by means of a conduit 238 from a pressure source (not shown). A hydraulic fluid control arrangement, which is interposed between the pneumatic pressure conduit 238 and the clamp carriage power cylinder 82, is activated through solenoid valve SV–1 to cause movement of the power cylinder 82. The hydraulic control arrangement comprises a pair of intermediate cylinders 239 and 240, each of which carry a movable piston and rod 241 and 242, respectively, within its interior. A hydraulic fluid chamber formed beneath each of the pistons 241 and 242, is in communication with the hydraulic fluid circuit, and a pneumatic fluid chamber formed above each of the pistons 241 and 242, is in communication with the pneumatic pressure fluid circuit. Conduits 243 and 244 connect the upper, pneumatic fluid, chamber of cylinders 239 and 240, respectively, with valve ports on solenoid valve SV–1. The valve, in turn, may selectively pressurize one or the other of conduits 243 and 244 depending upon which one of its solenoids SV–1A and SV–1B is energized. A hydraulic reservoir 245, which is normally half filled with oil, is connected through a spring biased selector valve 246 to the lower, hydraulic fluid, chambers of intermediate cylinders 239 and 240 by means of conduits 247 and 248, respectively. The lower, hydraulic fluid, chambers of cylinders 239 and 240, in turn, are connected to opposite ends of power cylinder 82 by means of conduits 249 and 250. A three way valve 251, which is provided with connections to receive pneumatic pressure fluid from each of the intermittently pressurized conduits 243 and 244 and automatically connects that conduit which is pressurized with the upper portion of reservoir 245, is provided to supply pneumatic pressure fluid to the reservoir. A pressure regulating valve 252, which is positioned in a conduit connecting the three way valve 251 with the hydraulic reservoir 245, is utilized to maintain the pressure in the upper portion of the hydraulic reservoir at a value somewhat below the pressure existing in the pneumatic pressure supply conduit 238, so that return flow of hydraulic fluid into the lower portion of the reservoir 245 may be effected when power cylinder 82 is actuated in one direction or another.

The operation of the pneumatic-hydraulic control system is as follows. Assuming that "clamp carriage to clamping position" solenoid SV–1A of solenoid valve SV–1 is energized, pneumatic pressure fluid will pressurize the upper, pneumatic fluid, chamber of intermediate cylinder 239 and will also actuate three way valve 251 to pressurize the top of reservoir 245. The bottom of reservoir 245 is, at this time, in communication with the upper portion of power cylinder 82 through conduit 250, the lower portion of intermediate cylinder 240, conduit 248, and the spring biased selector valve 246 which is in the position shown. The pressure in the upper, pneumatic fluid, chamber of intermediate cylinder 239 causes piston and rod 241 to move downwardly, thereby forcing hydraulic fluid from the lower, hydraulic fluid, chamber of intermediate cylinder 239 into the lower chamber of power cylinder 82, since the conduit 247 is at this time blocked by spring biased selector valve 246. The downward movement of piston and rod 241 results in movement of the piston rod of cylinder 82 out of the cylinder, which, in turn, carries the clamp carriage 39 into the fabric clamping position. As the piston rod of power cylinder 82 moves outwardly, the hydraulic fluid located in its upper chamber passes out of the chamber through conduit 250 into the lower hydraulic chamber of intermediate cylinder 240. This, in turn, results in upward movement of the piston and rod 242 until the lower chamber has completely filled, after which the additional hydraulic fluid will pass through selector valve 246 into the hydraulic fluid reservoir 245. It should be pointed out at this time that the upper, pneumatic fluid, chamber of intermediate cylinder 240 is connected to the atmosphere during this sequence of operations by means of conduit 244, solenoid valve SV–1, and conduit 253. It should also be noted that the right-hand side of spring biased selector valve 246 is connected to atmospheric pressure through the same circuit and, therefore, it will be retained in the position shown. Thus, actuation of solenoid SV–1A results in movement of the clamp carriage 39 to the fabric clamping position.

Should solenoid SV–1A be de-energized and "clamp carriage to cutting position" solenoid SV–1B be actuated, solenoid valve SV–1 would then shift to the left causing conduit 244 to become pressurized and conduit 243 to be connected to the atmosphere. This, in turn, would cause spring biased selector valve 246 to shift to its left-hand position at which conduit 248 would become blocked and conduit 247 would be connected to the lower portion of hydraulic reservoir 245. Following this, piston and rod 242 would begin depressing, piston and rod 241 would begin rising, and hydraulic power cylinder 82 would reverse its movement so that its piston rod would begin to retract carrying with it the fabric clamp carriage 39. Assuming that solenoid valve SV–2 is in the position shown, wherein "close clamping means solenoid" SV–2A has previously been energized and power cylinder 60 has previously actuated the fabric clamping means 40 to grip the fabric, the retracting movement of the piston rod of power cylinder 82 (FIG. 1) will cause the fabric to be cut to be pulled out below the fabric cutting means 5 until the clamp carriage 39 reaches the fabric cutting position. When the clamp carriage 39 reaches the fabric cutting position, the rear portion of the carriage will be in abutment with the stop contacts 85 and 86 carried by the power cylinders 87 and 88, respectively. At this point in the operation of the machine, a "clamp carriage to clear position" solenoid of solenoid valve SV–4 (FIG. 16), which retracts the stop contacts 85 and 86, is deenergized and, since solenoid valve SV–4 is spring biased to the right, pneumatic pressure fluid will be acting on the lower portions of the power cylinders 87 and 88 to cause their piston rods to be extended outwardly.

When contacts 85 and 86 are picked up by contacts 83 and 84 on the rear portion of clamp carriage 39 (FIG. 1), "raise platform means" solenoid SV–3A (FIG. 16) of solenoid valve SV–3 becomes actuated, which results in movement to the right of the solenoid valve SV–3. This, in turn, causes pneumatic pressure fluid to flow through the solenoid valve SV–3 into the left-hand side of power cylinder 102, which, in turn, causes its piston rod to extend out, thereby raising the platform means 99 to support the fabric to be cut. When the platform means 99 has been raised into contact with the fabric to be cut, limit switch LS–2 (FIG. 9) becomes actuated, and this, in turn, initiates a cutting stroke in the cutting means 5. Upon completion of the cutting stroke and return stroke, during which limit switches LS–5, LS–6 and LS–7 (FIG. 1) will have been cycled, "open clamping means" solenoid SV–2B of solenoid valve SV02 is energized by the re-actuation of limit switch LS–5. This, in turn, results in actuation of power cylinder 60 to release or open the fabric clamping means 40. The unclamping or releasing of the fabric is sensed by limit switch LS–3 (FIG. 6) which, in turn, initiates the energization of the "clamp carriage to clear position" solenoid of solenoid valve SV–4 (FIG. 16) and results in the shifting of that solenoid valve to the left against its spring bias. This causes a retraction of the piston rods of power cylinders 87 and 88 and, consequently, a movement of the stop contacts 85 and 86 towards the power cylinders 87 and 88.

With solenoid valve SV–4 energized (FIG. 16), and since the upper chamber of power cylinder 82 is still being pressurized by solenoid valve SV–1, clamp carriage 39 will move an additional amount, which corresponds to the movement of the piston rods of power cylinders 87 and 88, to a new position known as the fabric clear position. At the fabric clear position the fabric clamping means 40 will be completely disengaged from the cut section of fabric.

With the movement of the fabric clamp carriage 39 to the fabric clear position, the rear portion of the clamp carriage 39 (FIG. 1) actuates limit switch LS–8 which, in turn, causes the "lower platform means" solenoid SV–3B of solenoid valve SV–3 (FIG. 16) to become energized. When solenoid SV–3B is energized, solenoid valve SV–3 assumes the position shown in FIG. 16 and pneumatic pressure fluid then operates in power cylinder 102 to lower the platform means 99, thereby depositing the cut section of fabric onto the conveying means 6.

The conveying means 6 carries, at high speed, the cut section of fabric to the splicing means 7, which is raised and lowered by means of power cylinder 139 and its associated solenoid valve SV–5. The photoelectric relays PER–1 and PER–2 (FIG. 1) are utilized to control the action of solenoid valve SV–5 in a manner which will be described in greater detail under the heading of Electrical Control System. For purposes of this discussion, when the trailing edge of the first cut section of fabric passes the photoelectric cell of relay PER–1 the conveying means 6 will slow down to a crawling speed and when it passes the photoelectric cell of relay PER–2 the conveying means 6 will stop. The stopping of the conveying means 6, in turn, results in the energization of a "raise splicing means" solenoid SV–5A of solenoid valve SV–5. With solenoid SV–5A energized, solenoid valve SV–5 (FIG. 16) shifts to the left, thereby allowing pneumatic pressure fluid to actuate power cylinder 139 to raise the splicing means 7. The movement of a succeeding cut section of fabric past the photoelectric cells of relays PER–1 and PER–2 and into overlapped relation with the trailing edge of the first cut section of fabric causes a "lower splicing means" solenoid SV–5B of solenoid valve SV–5 to become energized and results in movement of the valve to the right to the position shown in FIG. 16. This, in turn, causes the power cylinder 139 to retract its piston, thereby lowering the splicing means 7 to effect a splice between the overlapped portions of the first and second cut sections of fabric.

The lowering of the splicing means 7 is sensed by limit switch LS–9 (FIG. 10) and, in turn, causes the conveying means 6 to start up at high speed to move the spliced sections of fabric into the fabric wind-up means 8. Hand operated valves 254 are provided between the pneumatic pressure line 238 and power cylinders 159 which control the movement of the wind-up units 152 and 153 (FIG. 14). It is, of course understood that one or the other of wind-up units 152 and 153 will be used to wind-up the spliced strip of bias cut fabric at all times during the operation of the machine. The manual control, by virtue of hand operated valves 254, allows the operator to service the fabric wind-up means 8 and unload those fabric wind-up rolls 156 (FIG. 14) which have been fully wound without interrupting operation of the machine.

*Electrical control system*

In order to arrive at an understanding of the operation of the various electrical components which comprise the electrical control system of the machine, reference will now be made to the electrical schematic wiring diagrams represented by FIGS. 23, 23A, 23B and 23C, and to the sequential action chart, FIG. 15, wherein the sequential action of the various electrical components of the machine are represented by horizontal action lines.

Figure 15:
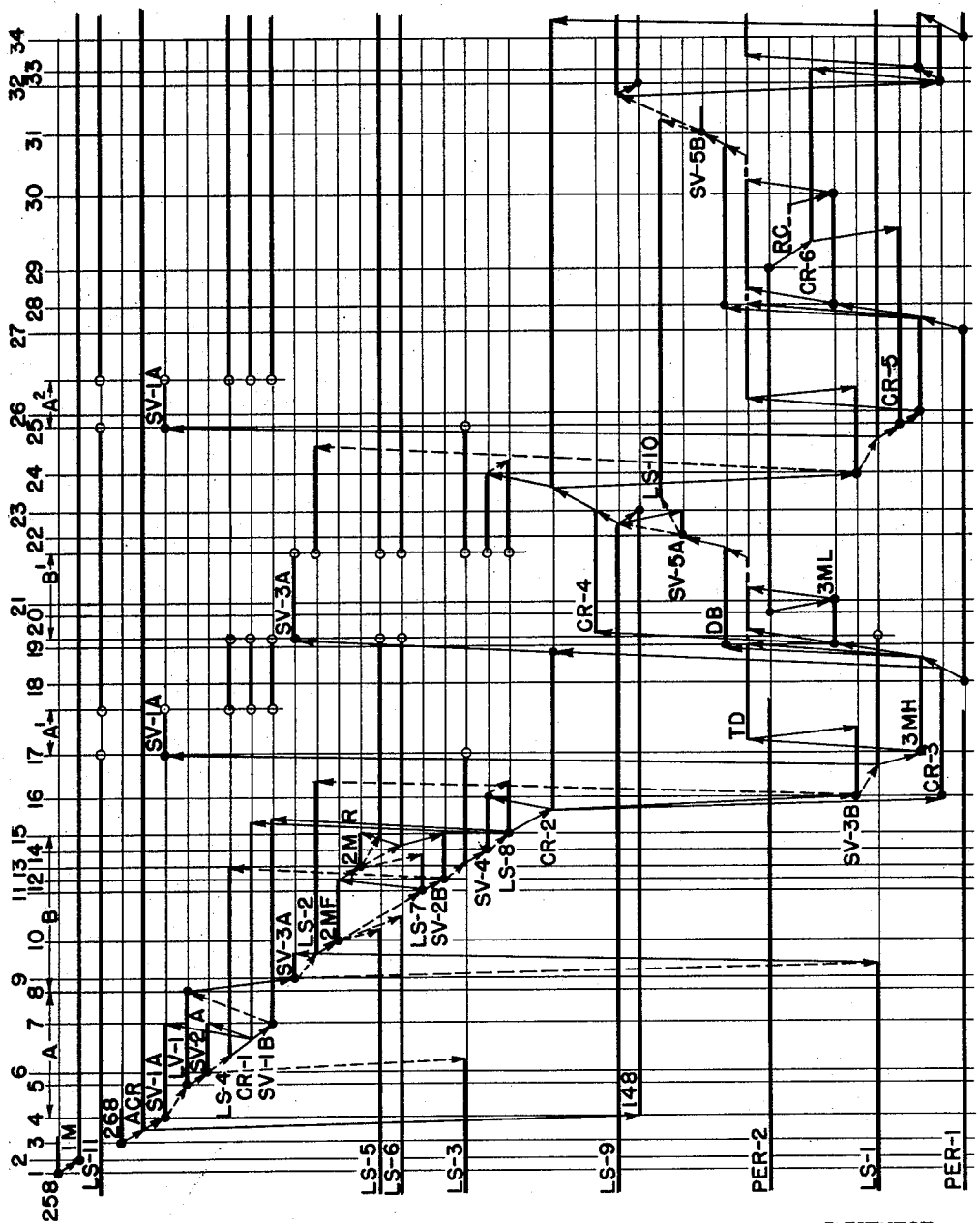
FIG. 15 is a diagram representing the sequence of operations of the various mechanical and electrical components of the machine.

The parallel vertical lines of the sequence chart of FIG. 15, which are identified by the numerals 1 through 34, represent the various steps which occur from the time at which the machine is initially started up until the time when the second bias-cut section of fabric has been spliced to the first bias-cut section of fabric and the first section has moved into the fabric wind-up means 8, at which time the sequence of operations of the machine becomes repetitive. The vertical step lines 1 through 34 of FIG. 15 refer to the following actions:

(1) Rotary cutter drive motor start push button 258 depressed.
(2) Rotary cutter drive motor M–1 starts.
(3) Automatic cycle start push button 268 depressed.
(4) Clamp carriage 39 starts to fabric clamping position.
(5) Clamp carriage 39 reaches fabric clamping position.
(6) Fabric clamping means 40 closes to grip fabric.
(7) Clamp carriage 39 starts to fabric cutting position.
(8) Clamp carriage 39 in fabric cutting position.
(9) Platform means 99 rises.
(10) Cutting stroke starts.
(11) Cutter carriage 114 arrives at completion of cutting stroke position.
(12) Fabric clamping means 40 opens to release fabric.
(13) Cutter carriage 114 begins return stroke.
(14) Clamp carriage 39 starts toward fabric clear position.
(15) Clamp carriage 39 reaches fabic clear position.
(16) Platform means 99 starts lowering.
(17) Reloading of clamp carriage with second section of fabric begins, and conveying means 6 starts high speed operation.
(18) Trailing edge of first bias-cut section of fabric uncovers photo-cell of relay PER–1.
(19) Conveying means 6 starts low speed operation.
(20) First bias-cut section of fabric uncovers photo-cell of relay PER–2.
(21) Conveying means 6 brakes to a stop.
(22) Splicing means 7 raises.
(23) Magnetic clutch 148 is released.
(24) Platform means 99 lowers with second bias-cut section of fabric.
(25) Reloading of clamp carriage with third section of fabric begins.
(26) Conveying means 6 starts high speed operation.
(27) Leading edge of second bias-cut section of fabric covers photo-cell of relay PER–1.
(28) Conveying means 6 starts low speed operation.
(29) Second bias-cut section of fabric covers photo-cell of relay PER–2 (metering for overlap starts).
(30) Conveying means 6 brakes to a stop.
(31) Splicing means 7 begins to lower.
(32) Magnetic clutch 148 becomes engaged.
(33) Conveying means 6 starts high speed operation.
(34) Trailing edge of second bias-cut section of fabric uncovers photo-cell of relay PER–1 and cycle begins to repeat from step 18 above.

Each of the various horizontal lines that are parallelly arranged across the face of the sequential action chart of FIG. 15 represents a different one of the various electrical components which partake in providing for sequential automatic operation of the machine and is identified by such component. The heavy, darkened portions of each horizontal line are indicative of those periods during which the component associated with that line is in its actuated (switches) or energized (relays, solenoids, clutch) condition. The light, thin portions of each line are indicative of those periods during which the component associated with that line is in its de-actuated or de-energized condition. For example, solenoid SV–1A is utilized to drive the clamp carriage 39 to the fabric clamping position and remains energized until solenoid SV–1B is energized to retract the clamp carriage 39 back to the farbic cutting position. The energization of solenoid SV–1A may be observed on the sequential action chart of FIG. 15 during this period by the heavy darkened horizontal line which extends between vertical step line 4 and vertical step line 7. The indication of the condition of actuation or energization of the various other electrical components is similarly presented and, therefore, by following a given vertical step line down through the various horizontal lines, the condition of each of the electrical components can be determined for any given step during the sequence of operations of the machine. This feature of FIG. 15 is designed to assist in the interpretation of the schematic diagrams of FIGS. 23, 23A, 23B and 23C.

A number of additional informational features are incorporated into the sequential action chart of FIG. 15 to assist in arriving at an understanding of the operation of the machine. These features are set forth in following paragraphs.

A number of continuous line arrows are provided which extend somewhat diagonally to connect various of the horizontal lines. These continuous line arrows represent electrical action lines which signify that the energization or de-energization of one component initiates the energization or de-energization, as the individual case may be, of the connected component. Thus, for example, when rotary cutter drive motor push button switch 258 is depressed at vertical step line 1, it electrically energizes rotary cutter drive motor control relay 1M at vertical step line 2, as shown by the electrical action line extending diagonally downwardly and to the right between vertical step lines 1 and 2.

A number of discontinuous line arrows are also provided which extend somewhat diagonally to connect various of the horizontal lines. These discontinuous or broken line arrows represent mechanical action lines which signify that the actuation or de-actuation of a component is the result of a mechanical movement of some portion of the machine, which movement was initiated by one of, and sensed by the other of, the connected electrical components. Thus, for example, when solenoid SV–1A is energized at vertical step line 4 and the clamp carriage 39 moves to the fabric clamping position, the mechanical movement results in the closing of contacts 78 through 81 (FIG. 3) which, in turn, causes a low voltage relay LV–1 to be energized, as shown at vertical step line 5 on FIG. 15. The foregoing sequential action is represented on FIG. 15 by the mechanical action line extending diagonally downwardly and to the right between vertical step lines 4 and 5.

A few of the horizontal component lines are also shown by discontinuous or broken lines. The broken horizontal lines represent timing or counting periods during which a specified operation is performed. Thus, the horizontal broken line shown beginning after vertical step line 29 and ending prior to vertical step line 30 is representative of the time during which a revolution counting relay RC is actuated to meter the overlap for splicing between successive bias-cut sections of fabric. Similarly, the horizontal broken line shown beginning after vertical step line 30 and ending prior to vertical step line 31 is representative of a timing period during which a braking force is applied, under the control of a time delay relay TD, to stop the conveying means 6 after the correct overlap for splicing has been metered.

The letter A, which denotes the sequence of steps occurring between vertical step lines 4 through 8 on FIG. 15, as indicated by the horizontal arrow extending between those vertical step lines, represents that sequence of operations during which the cutting means 5 is loaded with a pre-determined length of fabric to be cut. During this time the clamp carriage 39 moves to the fabric clamping position, the fabric clamping means 40 closes about the leading edge of the fabric to be cut, and then the clamp carriage 39 returns to the fabric cutting position. In order to avoid undue complexity in the sequential action chart of FIG. 15, the subsequent reloading operations of the cutting means 5 have been indicated by the letters $A^1$, occurring at vertical step line 17, and $A^2$, occurring at vertical step line 25. It will, of course, be understood that the sequence of operations of the clamp carriage 39 and fabric clamping means 40 will be the same at $A^1$ and $A^2$ as that which occurred at A, even though $A^1$ and $A^2$ have been shown as occurring in a shortened horizontal space.

Similarly, the letter B, which denotes the sequence of steps occurring between vertical step lines 8 and 15, as indicated by the horizontal arrow extending between those vertical step lines, represents that sequence of operations which occur after the clamp carriage 39 has reached the fabric cutting position. In this sequence, the platform means 99 rises, the cutting stroke commences, the cutter carriage 114 completes the cutting stroke, the fabric clamping means 40 opens, the cutter carriage 114 begins its return stroke, and the clamp carriage 39 moves to the fabric clear position. As before, the letter $B^1$ is now used to indicate a repetition of the sequence of cutting actions denoted by the letter B. The repeat cycle of $B^1$ may be seen commencing just after vertical step line 19 to indicate that the second section of fabric is being cut. Although $B^1$ is shown as occupying less horizontal space than B itself, it will be understood here again that this is being done merely to improve the clarity of FIG. 15 and that each of the steps of vertical step lines 8 through 15 will actually take place during the $B^1$ sequence of actions.

Referring now to the electrical control system schematic diagram, a portion of which is shown in each of FIGS. 23, 23A, 23B and 23C, there has been illustrated the circuit means by which all of the electrical components of the bias cutting and splicing machine are interconnected. Electrical power for operating the machine may be brought in through a circuit breaker (not shown) by means of main power leads L1, L2 and L3, which may, for example, comprise a three-phase 440 volt power supply circuit. One phase, L1–L3 of the three-phase 440 volt supply circuit is connected across the primary of a step down transformer 255 to convert it into a lower voltage, for example 110 volts, which is utilized as a control voltage in the electrical control system. The 110 volt control voltage is distributed to the various control components of the machine by control voltage leads 256 and 257, which are connected to the secondary of step down transformer 255.

Assuming that the fabric let-off unit 3 (FIG. 1) has been loaded with a roll of calendered tire fabric to be cut, that the fabric has been threaded through the festoon-like fabric support 20 (FIG. 2) and led to the cutting means 5 (FIG. 1), and that the leading edge of the fabric has been trimmed to conform to the angle of the cut, the starting operation of the electrical control system of the machine may be described as follows. Rotary cutter motor start push button switch 258 (FIG. 23) is depressed to connect a rotary cutter motor relay 1M across the control voltage leads 256 and 257 through a normally closed system stop push button switch 259. The rotary cutter motor control relay 1M then picks up and locks itself in an energized condition by means of its contacts 260, which are connected in parallel with the push button switch 258. Contacts 260 also serve to apply control voltage to an auxiliary control voltage conductor 261. The remaining contacts of relay 1M, contacts 262, 263 and 264, are utilized to connect the three-phase 440 volt conductors L1, L2, and L3, respectively, to the rotary cutter motor M–1. Thus, both the cutter motor M–1 and the auxiliary control voltage conductor 261 will remain energized throughout all subsequent automatic operations of the machine. Once the cutter motor start push button 258 has been depressed, only the opening of the system stop push button 259 will de-energize the cutter motor M–1 and auxiliary control voltage conductor 261.

The energization of auxiliary control voltage conductor 261 by rotary cutter motor relay 1M, in turn, causes the fabric let-off drive motor M–4 to operate if the dancer bar 24 (FIG. 2) is not in its lower position at which limit switch LS–11 is actuated. The circuit by which this is accomplished may be seen by tracing auxiliary voltage conductor 261 along onto FIG. 23C where it will be observed that a fabric let-off drive motor relay 4M is connected through normally closed contacts LS–11B of limit switch LS–11 across auxiliary control voltage conductor 261 and control voltage lead 257. Thus, with limit switch LS–11 deactuated, relay 4M will pick up and connect the fabric let-off drive motor M–4 with the 440 volt power supply lines L1, L2 and L3 through its contacts 265, 266 and 267, respectively. The fabric let-off drive motor M–4 will then unwind additional fabric from the fabric let-off unit until dancer bar 24 (FIG. 2)

actuates limit switch LS–11, which in turn, opens contacts LS–11B (FIG. 23C) to de-energize relay 4–M.

With limit switch LS–11 having been actuated by the dancer bar 24, the electrical control system is in proper condition to commence automatic sequential operation. Referring to FIG. 23, an automatic cycle start push button switch 268 is provided which connects control voltage from auxiliary control voltage conductor 261, through now closed contacts LS–11A of limit switch LS–11, normally closed limit switch LS–12, and three normally closed push button switches, which will be referred to in greater detail hereinafter, to energize an automatic cycle relay ACR. The energization circuit is completed by a connection from automatic cycle relay ACR to control voltage lead 257. Thus, depression of automatic cycle start push button switch 268 results in energization of automatic cycle relay ACR to initiate automatic sequential operation of the machine. When relay ACR is energized, it locks itself in through contacts 269, which are connected in parallel with push button switch 268 and contacts LS–11A. Thus, the subsequent operation of either limit switch LS–11 or push button switch 268, once relay ACR is energized will not have any effect on the operation of that relay. It should be noted at this point that contacts LS–11A serve to prevent the initial energization of automatic cycle relay ACR until such time as the dancer bar 24 (FIG. 2) actuates limit switch LS–11. This insures that the machine will have sufficient fabric unwound and in the festoon-like fabric support 20 to commence automatic operation. It should also be noted that contacts 269 of relay ACR energize a second auxiliary control voltage conductor 270 when they pick up, in addition to locking the relay in an energized condition.

Assuming that the platform means 99 (FIG. 9) is in its lower position, thereby actuating limit switch LS–1 to close its contacts, and further assuming that the cutter carriage 114 (FIG. 1) is in its rest position prior to starting a cutting stroke, thereby resulting in limit switch LS–5 being actuated to close its contacts, the "clamp carriage to clamping position" solenoid SV–1A will become energized through a circuit including conductor 270, the now closed contacts of limit switch LS–1, the now closed contacts of limit switch LS–5, and the normally closed contacts 271 of a meter fabric control relay CR–1, which is de-energized at this time. Energization of solenoid SV–1A (FIG. 16) then results in actuation of power cylinder 82 to move the clamp carriage 39 to the fabric clamping position. This movement of the clamp carriage 39 causes contacts 78 and 80 (FIG. 3) carried by the fabric clamping means 40 to engage contacts 79 and 81, respectively, carried by the framework of the cutting means 5.

Referring back to FIG. 23 it may be seen that a second step down transformer 272 is provided, having its primary circuit connected across the 110 volt control voltage leads 256 and 257 and its secondary circuit arranged to energize a low voltage relay LV–1. The step down transformer 272 may, for example, reduce the 110 volt control voltage to a value of 12 volts which would be suitable for use with the exposed contacts 78 through 81 (FIG. 3) and 83 through 86 (FIG. 1). With the clamp carriage 39 in the fabric clamping position and contacts 78 and 80 (FIG. 23) made with contacts 79 and 81, respectively, low voltage relay LV–1 will be energized and, in turn, will lock itself in through its contacts 273 and a resistor 274, which is located in the secondary circuit of step down transformer 272. Resistor 274 should be chosen of such a value that when contacts 78 through 81 are broken, and prior to the closing of contacts 83 through 86, low voltage relay LV–1 will be maintained energized through its contacts 273 and the resistor 274. Thus, the voltage drop across the resistor when it is connected in series with relay LV–1 should not be sufficient to cause the relay to be de-energized. Similarly, the power rating of the resistor 274 should be sufficient to allow the entire 12 volt drop to occur thereacross when low voltage relay LV–1 is shunted out of the secondary circuit of transformer 272 by the closing of contacts 83 through 86. This occurs when the clamp carriage 39 is retracted to the fabric cutting position. It is apparent, of course, that the 12 volt drop across resistor 274 will only be applied momentarily until the relay LV–1 drops out and its contacts 273 open the secondary circuit of transformer 272. Therefore, this factor should also be considered in choosing the proper power rating for resistor 274.

Returning now to a consideration of the automatic sequential operation of the electrical control system, the energization of low voltage relay LV–1 also causes its contacts 275 to be picked up, thereby applying control voltage from conductor 270, through limit switches LS–1 and LS–5, which are both closed at this time, a lead 276, the aforementioned contacts 275, contacts 277 of meter fabric control relay CR–1, which are closed at this time, to the "close clamping means" solenoid SV–2A. With the energization of solenoid SV–2A (FIG. 16), the power cylinder 60 is actuated, which, in turn, causes the fabric clamping means 40 to grip the fabric 1 beneath the cutting means 5 (FIG. 1). This, in turn, results in limit switch LS–4 (FIG. 5) being actuated to close its contacts. Returning to FIG. 23, it may be seen that when limit switch LS–4 is actuated or closed, control voltage is applied to a meter fabric control relay CR–1, through lead 278, to energize that relay.

The energization of meter fabric control relay CR–1 causes its contacts 279 to pick up, thereby applying control voltage to energize the "clamp carriage to cutting position" solenoid SV–1B from lead 276, through the presently closed contacts 275 of low voltage relay LV–1, the closed limit switch LS–4, and the now closed contacts 279. Similarly, the energization of meter fabric control relay CR–1 results both in the opening of its contacts 271 to the "clamp carriage to clamping position" solenoid SV–1A and in the opening of its contacts 277 to the "close clamping means" solenoid SV–2A. Thus, referring to FIG. 16, it may be seen that power cylinder 82 will then have its direction reversed due to the action of solenoid SV–1B so that the clamp carriage 39 will be retracted to the fabric cutting position.

Upon return of the clamp carriage 39 to the fabric cutting position (FIG. 1), contacts 83 through 86 will be picked up and (FIG. 23) low voltage relay LV–1 will be caused to drop out due to the shunting of its relay coil by the contacts 83 through 86. The secondary circuit of transformer 272 will then be opened because contacts 273 of the low voltage relay LV–1 open when that relay drops out.

With the dropping out of low voltage relay LV–1, its contacts 280 close, thereby placing control voltage through contacts 281 of meter fabric control relay CR–1, which is now energized, and contacts 282 of transfer fabric control relay CR–2, which is de-energized at this time, to the "raise platform means" solenoid SV–3A, to energize that solenoid. Referring to FIG. 16, it may be seen that when solenoid SV–3A is energized it causes the piston rod of power cylinder 102 to be driven out of the cylinder and this, in turn, causes the platform means 99 to be raised (FIG. 9). With the raising of the platform means 99, limit switch LS–2 becomes actuated to initiate subsequent operations in the electrical control system of the machine.

Remembering that meter fabric control relay CR–1 is energized and that, therefore, its contacts 283 are closed, it may be seen that (FIG. 23) control voltage is applied from lead 270, through the now closed contacts of limit switch LS–2, conductor 284, contacts 283 of relay CR–1, normally closed contacts LS–3B of limit switch LS–3, conductor 285 (FIG. 23A), normally closed contacts 286, normally closed contacts LS–7A of limit switch LS–7, and contacts 287 of a cutter carriage reverse drive motor relay 2MR to energize a cutter carriage forward drive motor relay 2MF. Relay 2MF partially locks itself in by means of its contacts 288, which shunt out contacts 283 of meter fabric control relay CR–1, to make the subsequent condition of energization of relay 2MF independent of control relay CR–1. The energization of cutter carriage forward drive motor relay 2MF connects cutter carriage drive motor M–2 with the 440 volt power supply lines L1, L2 and L3, through its contacts 289, 290 and 291, respectively, thereby driving the cutter carriage 114 (FIG. 1) through a cutting stroke.

In moving through the cutting stroke, the cutter carriage 114 first de-actuates limit switch LS–5, then de-actuates limit switch LS–6, and, finally, completes its cutting stroke by actuating limit switch LS–7 at the end of cut position. The actuation of limit switch LS–7 (FIG. 23A) causes contacts LS–7A to open, thereby de-energizing cutter carriage forward drive motor relay 2MF which, in turn, stops cutter carriage drive motor M–2. Similarly, contacts LS–7B of limit switch LS–7 are closed by the actuation of limit switch LS–7 and control voltage is applied from lead 284 via lead 292, closed contacts LS–7B and lead 293 to the "open clamping means" solenoid SV–2B to energize that solenoid. Normally closed contacts, which are utilized in manual control of the cutter carriage, are provided in each of leads 292 and 293 and, since they are not involved in the automatic operation of the machine, their functions will be hereinafter described. Concurrently with the energization of the "open clamping means" solenoid SV–2B, control voltage is applied through lead 294 and contacts 295 of relay 2MF, which closed upon the de-energization of that relay, to cause energization of cutter carriage reverse drive motor relay 2MR. The circuit through relay 2MR is completed by means of lead 296 which connects to control voltage lead 257.

The energization of relay 2MR results in 440 volt power being supplied in reverse phase to motor M–2 by means of contacts 297, 298 and 299, which connect 440 volt lead lines L1, L2 and L3, respectively, to the input terminals of motor M–2. Additionally, cutter carriage reverse drive motor relay 2MR locks itself in an energized condition, with contacts LS–7B out of the circuit, by means of control voltage derived from lead 270, through lead 300, contacts 301 of automatic control relay ACR which remains energized during automatic re-cycling operations of the machine, contacts 302 of relay 2MR, which is now energized, and limit switch LS–6, which is deactuated at this time due to the cutter carriage 114 being at the end of cut, or limit switch LS–7, position. Thus, (FIG. 1) the cutter carriage 114 will begin its return stroke and move towards the start of cut, or limit switch LS–5, position and will be unaffected by the de-actuation of limit switch LS–7 at the start of the return stroke.

Since the "open clamping means" solenoid SV–2B is energized concurrently with relay 2MR, it may be seen now, by reference to FIG. 16, that the clamping means 40 will be actuated by power cylinder 60, through the action of solenoid SV–2B, to unclamp or release the fabric that has been cut. The opening of the clamping means 40, in turn (FIG. 6), cause limit switch LS–3 to be actuated.

Remembering that the platform means 99 (FIG. 9) is raised at this time and, therefore, that limit switch LS–2 is actuated, it may be seen (FIG. 23) that control voltage will now be applied to the "clamp carriage to clear position" solenoid of solenoid valve SV–4. The circuit through which this is accomplished may be traced from auxiliary control voltage conductor 270, through the closed contacts of limit switch LS–2, the now closed contacts LS–3A of limit switch LS–3, normally closed contacts 301A of automatic cycle start push button 268, contacts 302A of transfer fabric control relay CR–2, which is de-energized at this time, and lead 303 to solenoid SV–4, the circuit being completed through control voltage lead line 257. As is apparent from FIG. 16, the actuation of the solenoid of solenoid valve SV–4 causes the pistons of power cylinders 87 and 88 to retract, carrying with them contacts 85 and 86, respectively. The retraction of the pistons of power cylinders 87 and 88 may be in the order of about 1 inch of movement and, since these pistons acted as stops which held the clamp carriage 39 at the fabric clear position, this movement allows the power cylinder 82 to retract still further to the fabric clear position at which the clamp carriage 39 again abuts against the stop contacts 85 and 86.

It may be recalled, at this point, that the last previous actuation of solenoid valve SV–1 occurred when the "clamp carriage to cutting position" solenoid SV–1B was energized to cause power cylinder 82 to retract clamp carriage 39 to the fabric cutting position. Solenoid SV–1B remained energized following this movement so that hydraulic pressure was continually being applied to power cylinder 82 in a direction to cause retraction of its piston rod. Thus, the subsequent retraction of the piston rods of power cylinders 87 and 88 allowed the additional movement of both the piston rod of power cylinder 82 and the clamp carriage 39 to the fabric clear position. It should be noted at this point that when the clamp carriage 39 moves to the fabric clear position (FIG. 1) limit switch LS–8 becomes actuated by means of a lug 45A, which is carried by the transverse rod 45 of the clamp carriage 39. This action, in turn, initiates the next sequence of automatic operations in the electrical control system for the machine.

Referring back to FIG. 23, it will be observed that meter fabric control relay CR–1 locked itself in the energized condition when it was picked up by means of a circuit including auxiliary control voltage conductor 270, the then closed contacts LS–8A of limit switch LS–8, contacts 303A of control relay CR–1, and conductor 278. Similarly, the "clamp carriage to cutting position" solenoid SV–1B of solenoid valve SV–1 was locked in an energized condition through the then closed contacts LS–8A of limit switch LS–8, contacts 303A, of control relay CR–1, conductor 278, and contacts 279 of control relay CR–1. The subsequent opening of limit switch LS–4, when the clamping means 40 (FIGS. 3 and 5) opened to release the fabric, therefore, did not affect the energization of solenoid SV–1B. Upon movement of the clamp carriage 39 to the fabric clear position and actuation of limit switch LS–8, however, contacts LS–8A open and (FIG. 23) cause the meter fabric control relay CR–1 to drop out, which, in turn, causes solenoid SV–1B to become de-energized.

Concurrently with the actuation of limit switch LS–8 and the opening of its contacts LS–8A, its contacts LS–8B (FIG. 23A) are closed thereby applying control voltage across a transfer fabric control relay CR–2 to energize that relay. The circuit by which control relay CR–2 is energized comprises auxiliary control voltage conductor 270 (FIG. 23), limit switch LS–2, which is closed at this time due to the platform means 99 being raised, conductor 284, contacts LS–8B (FIG. 23A) of limit switch LS–8 and normally closed contacts 304 of a raise splicing means control relay CR–4 (FIG. 23B), which is de-energized at this time. The energization of transfer fabric control relay CR–2 causes its contacts 305 to close, thereby applying control voltage to the "lower platform means" solenoid SV–3B through normally closed contacts 306 of a time delay relay TD (FIG. 23C) that has not been energized up to this point. In addition, contacts 282 (FIG. 23) of control relay CR–2 are opened by the energization of relay CR–2 to provide an interlock with the "raise platform means" solenoid SV–3A in order to insure that solenoid SV–3A remains de-energized while the "lower platform means" solenoid SV–3B is actuated.

Referring now to FIG. 16, it will be remembered that the energization of solenoid SV–3B causes power cylinder 102 to retract, thereby lowering the platform means 99. Since the cut piece of fabric is supported solely by the platform means 99 at this time, it also will be lowered and thereby placed on the conveying means 6 (FIG. 1).

Assuming that the splicing means 7 (FIG. 10) is lowered and, therefore, that limit switch LS–9 is actuated, a conveyor cycle control relay CR–3 (FIG. 23B) will also be energized when transfer fabric control relay CR–2 is picked up. The circuit by means of which control relay CR–3 is energized includes (FIG. 23A) auxiliary control voltage conductor 270, contacts LS–9B of limit switch LS–9, which are closed due to the splicing means 7 being in its lowered position, lead 307 (FIGS. 23A and 23B), lead 307A, contacts 308 of photoelectric relay PER–2, which is energized at this time due to the fact that there is no cut section of fabric blocking the light from hitting its photo-cell, normally closed contacts 309 of raise splicing means control relay CR–4, which is de-energized at this time, lead 310, and contacts 311 of control relay CR–2, which are now closed due to transfer fabric control relay CR–2 being energized. Thus, in addition to the platform means 99 being lowered at this time, the conveyor cycle control relay CR–3 is in an energized state.

When the platform means 99 (FIG. 9) lowered under the action of solenoid valve SV–3B, it actuated limit switch LS–1 and de-actuated limit switch LS–2 to initiate subsequent automatic sequential operations of the machine. Referring to FIG. 23, it will be seen that the actuation of limit switch LS–1 results in the application of control voltage to a third auxiliary control voltage conductor 312, due to the closing of the contacts of limit switch LS–1. Tracing conductor 312 down to FIG. 23B, and remembering that conveyor cycle control relay CR–3 is energized at this time, it may be observed that a circuit is completed through now closed contacts 313 of control relay CR–3 and normally closed contacts 314 of low speed conveyor motor drive relay 3ML, which is de-energized at this time, to energize high speed conveyor motor drive relay 3MH. The energization of high speed conveyor motor drive relay 3MH causes 440 volt line voltage from power lines L1, L2 and L3 to be applied to the high speed winding of the conveyor drive motor M–3 (FIG. 23C) through contacts 315, 316 and 317, respectively. Thus, the conveyor drive motor M–3 will operate at high speed to remove the bias-cut section of fabric from the area of the cutting means 5 and carry it to the area of the splicing means 7 (FIG. 1).

It is well to remember that, concurrently with the lowering of the platform means 99 and the commencing of high speed operation of the conveying means 6, the cutter carriage 114 (FIG. 1) is being driven back through its return stroke by cutter carriage drive motor M–2, which is under the control of cutter carriage reverse drive motor relay 2MR. Referring to FIG. 23A in conjunction with FIG. 1, it will be seen that on the return stroke, when the cutter carriage 114 reaches the position of limit switch LS–6, which may be conveniently termed a braking position, limit switch LS–6 will be actuated and will, in turn, open the control voltage circuit that energizes relay 2MR to de-energize that relay. This, in turn, opens contacts 297 through 299 which feed 440 volt power to the cutter carriage motor M–2 and results in the cutter carriage 114 coming to a stop at its rest or starting position, wherein limit switch LS–5 is actuated. Cutter carriage drive motor M–2 may be provided with a solenoid type brake (not shown) which will physically limit the coasting of the cutter carriage 114 by becoming engaged with the motor shaft when no power is applied to the motor. Thus, at the completion of the reverse stroke of the cutter carriage 114, the carriage will come to a stop at its rest position wherein limit switch LS–5 is actuated.

Referring now to FIG. 23, it will be seen that when limit switch LS–5 is actuated at the end of the return stroke of the cutter carriage 114 and limit switch LS–1 is actuated due to the lowering of the platform means 99, a circuit is completed to the "clamp carriage to clamping position" solenoid SV–1A to commence movement of the clamp carriage 39 to the fabric clamping position for reloading the cutting means 5 with a second length of fabric to be cut. The subsequent sequence of operations in reloading the cutting means 5 is indicated on FIG. 15 by the letter $A^1$. It involves a duplication of the steps occurring from vertical step lines 4 through 8 designated by the letter A and proceeds relatively independently of the subsequent operations which occur to the first cut section of fabric.

Resuming now, the consideration of the operation surrounding the movement of the first cut section of fabric along the conveying means 6 (FIG. 1), and remembering that the splicing means 7 is in its lower position, it will be found that high speed operation of the conveying means 6 continues until the leading edge of the first cut section of fabric has passed by the sensing means 122, thereby intercepting the light beam between the light source and photo-cell of each of the photoelectric relays PER–1 and PER–2, and moved well into the area above the splicing means 7. Conveyor cycle control relay CR–3, which controls the energization of high speed conveyor drive motor relay 3MH during the initial start-up period of the machine, prior to the passage of the first cut section of fabric onto the splicing means 7, and includes contacts 308 (FIG. 23B) of photoelectric relay PER–2 in its energization circuit, remains energized while the leading edge of the first cut section of fabric passes by the photo-cells of both photoelectric relays PER–1 and PER–2. The manner in which control relays CR–3 stays energized during this period is as follows. When photoelectric relay PER–1 becomes de-energized due to the cutting off of the light beam from its light source to its photo-cell, it provides a parallel circuit (FIG. 23A and FIG. 23B) through its contacts 318 for energizing control relay CR–3. The parallel circuit by which control relay CR–3 is energized includes auxiliary control voltage conductor 270 (FIG. 23A) the closed contacts LS–9B of limit switch LS–9 which is actuated due to the splicing means 7 being in its lower position, the aforementioned contacts 318 of de-energized photoelectric relay PER–1, lead 310 (FIG. 23B), and contacts 311 of control relay CR–2, which is energized at this time. Thus, when contacts 308 of photoelectric relay PER–2 drop out due to de-energization of that relay as the leading edge of the first cut section of fabric intercepts its light beam, control relay CR–3 remains energized through contacts 318 of photoelectric relay PER–1, allowing the conveyor drive motor M–3 to continue operating at high speed. When the trailing edge of the first cut section of fabric passes by the photo-cell of photoelectric relay PER–1, that relay becomes energized due to the light beam hitting its photo-cell, and, therefore, its contacts 318 open up, causing conveyor cycle control relay CR–3 to become de-energized. The de-energization of control relay CR–3 results in the opening of its contacts 313, which, in turn, remove control voltage from high speed conveyor drive motor relay 3MH and cause it to drop out.

A time delay relay TD (FIG. 23C) is provided in the electrical control system which operates in conjunction with a dynamic braking relay DB in order to control the low speed and braking operation of the conveyor drive motor M–3. Time delay relay TD is energized from control voltage lead 256 through either contacts 319 of high speed conveyor motor drive relay 3MH or contacts 320 of a low speed conveyor motor drive relay 3ML. The time delay relay TD may be of a conventional type which utilizes a dash pot (not shown), or other time delay means, to provide a few seconds delay in the dropping out of the relay when it is de-energized. It should be pointed out at this time that when high speed conveyor motor drive relay 3MH was energized, it, in turn, energized the time delay relay TD by its contacts 319. The time delay relay TD, in turn, by virtue of the opening of its contacts 306 (FIG. 23A), de-energized solenoid SV–3B after the platform means 99 had been lowered and the conveyor drive motor M–3 had started high speed operation.

When high speed conveyor motor drive relay 3–MH drops out and its contacts 319 open, time delay relay TD remains in its picked up condition due to the time delay feature for a sufficient length of time for low speed conveyor drive motor relay 3ML to be energized and, in turn, re-energize the time delay relay TD through its contacts 320.

Low speed conveyor drive motor relay 3ML is energized when high speed conveyor drive motor, relay 3MH drops out by the closing of contacts 322 of relay 3MH. The circuit through which low speed conveyor motor drive relay 3ML is energized includes (FIG. 23A) control voltage lead line 270, contacts LS–9B of limit switch LS–9, which are closed at this time due to the splicing means 7 being in its lowered position, lead 307, lead 307A (FIG. 23B), lead 323, normally closed contacts 324 of photoelectric relay PER–2, which is de-energized at this time due to the first cut section of fabric being between its light source and its photo-cell, contacts 325 of conveyor cycle control relay CR–3, which is de-energized at this time, normally closed contacts 326 of a second conveyor cycle control relay CR–5, which is also de-energized at this time, normally closed contacts 327 of an overlap and lower splicing means control relay CR–6, which is de-energized at this time, normally closed contacts 328, lead 329, and the above-mentioned closed contacts 322 of relay 3MH.

The energization of low speed conveyor drive motor relay 3M1 causes its contacts 330, 331 and 332 to close, which, in turn, connects the 440 volt power leads L1, L2, and L3 respectively, with the low speed windings of conveyor drive motor M3. A voltage dropping resistance network, shown generally at 333, is provided in one of the low speed winding leads to insure that the low speed windings will be energized with a lower voltage than were the high speed windings. In order to further limit the low speed operation of the conveyor drive motor M–3 to a crawling or creeping speed, provision is made to apply dynamic braking to the motor. This is accomplished by means of the dynamic braking relay DB (FIG. 23C), which becomes energized from control voltage lead 256 through the closed contacts 334 of the energized time delay relay TD by the closing of contacts 335 of the high speed conveyor drive motor relay 3MH when that relay is de-energized. Thus, with the dropping out of high speed conveyor drive motor relay 3MH and picking up of low speed conveyor drive motor relay 3ML, the dynamic braking relay DB becomes energized to effect dynamic braking of the conveyor drive motor M–3. The dynamic braking is achieved by applying a D.C. voltage across one of the high speed windings of the conveyor drive motor M–3, while the low speed windings of the motor are energized by an A.C. voltage. The D.C. voltage may be obtained by means of a rectifier bridge network, shown generally at 336, that is connected across the 110 volt A.C. control voltage lead lines 256 and 257 to provide full wave rectification of the A.C. control voltage. The D.C. voltage may be drawn off the rectifier bridge 336 at its terminals 337 and 338 in a conventional manner and passed through a pair of voltage dropping variable resistors 339 and 340, which are provided in one leg of the D.C. circuit, in order to adjust the level of the D.C. voltage to a desired value. The D.C. circuit is connected across one of the high speed windings of the conveyor drive motor M–3 by means of contacts 341 and 342 of the dynamic braking relay DB. Similarly, the A.C. control voltage is applied to the rectifier bridge network 336 by means of contacts 343 of the dynamic braking relay DB. Thus, in addition to applying a lower A.C. voltage to the low speed windings of the conveyor drive motor M–3 when low speed operation is inaugurated, crawling speed is achieved by applying a dynamic braking D.C. voltage across one of the high speed windings of the motor.

Low speed conveyor drive motor relay 3ML initiates a further operation in the electrical control system when it picks up in that it energizes raise splicing means control relay CR–4 (FIG. 23B). This is occasioned by the closing of contacts 344 of relay 3ML, which close an energization circuit to control relay CR–4 that includes auxiliary control lead 270 (FIG. 23A), contacts LS–9B of limit switch LS–9, which are closed at this time due to the splicing means 7 being in its lower position, lead 307, lead 345 (FIG. 23B), and the aforementioned contacts 344 of relay 3ML to energize control relay CR–4. Upon being energized, control relay CR–4 locks itself in directly from lead 345 by the closing of its contacts 346, which are connected in parallel with contacts 344 of relay 3ML. Thus, a subsequent change in the state of low speed drive motor relay 3ML will not have any effect on the condition of control relay CR–4. Raise splicing means control relay CR–4 contains an inter-lock through its contacts 304 (FIG. 23A) with the energization circuit for transfer fabric control relay CR–2. In this manner, the energization of control relay CR–4 will prevent control relay CR–2 from being actuated regardless of the condition of limit switch LS–8 (which will be actuated each time that clamp carriage 39 retracts to the fabric clear position in the almost independent cutter loading and fabric cutting operations). This action prevents control relay CR–2 from being energized and, in turn, energizing the "lower platform means" solenoid SV–3B to lower a subsequent cut section of fabric on the conveying means prior to the proper placing of a preceding cut section of fabric on the splicing means 7. A similar type of inter-lock is provided by contacts 309 of control relay CR–4 (FIG. 23B) in order to prevent control relay CR–3 from being energized to initiate high speed operation of the conveying means 6 during the time that a preceding cut section of fabric is being positioned on the splicing means 7. An additional set of contacts 346A (FIG. 23C) are closed by the energization of control relay CR–4 in order to pre-condition an energization circuit to the "raise splicing means" solenoid SV–5A of solenoid valve SV–5, which will later be utilized to raise the splicing means 7 to its upper position. This will occur when contacts 347 of dynamic braking relay DB become closed upon a subsequent de-energization of that relay.

Thus, resuming a consideration of the sequential actions of the machine, the condition of operation at this point is as follows: The trailing edge of the first cut section of fabric has passed the first photoelectric relay PER–1 but has not yet uncovered the photo-cell of the second photoelectric relay PER–1; the conveying means 6 is moving at a creeping or crawling speed due to the dynamic braking of the conveyor drive motor M–3; and a second extended section of fabric is being cut by the cutting means 5. At this time, the next major sequence of actions occurs when photoelectric relay PER–2 becomes energized due to the trailing edge of the first cut section of fabric passing by its photo-cell, thereby allowing its light source to hit its photo-cell. When this occurs, contacts 324 (FIG. 23B) of photoelectric relay PER–2 are opened and this, in turn, disconnects the energization circuit to low speed conveyor drive motor relay 3ML, thereby dropping out this relay. The de-energization of relay 3ML, in turn, drops out its contacts 330, 331 and 332 (FIG. 23C) so that three phase voltage is no longer supplied to the low voltage winding of the conveyor drive motor M–3. Additionally, the deenergization of relay 3ML causes its contacts 320 to open, thereby de-energizing the time delay relay TD. However, since time delay relay TD has a mechanical or other time delay feature which prevents its dropping out for a few seconds after the relay has been de-energized, its contacts 334 remain closed a few seconds, thereby keeping the dynamic braking relay DB energized for the additional period of time. With the dynamic braking relay DB energized, the D.C. voltage being applied to the high speed winding of the conveyor drive motor M–3, in the absence of an A.C. voltage on the low speed winding, effectively acts as a clamp or brake to stop the conveyor drive motor M–3 almost instantaneously, thereby achieving positive positioning of the trailing edge of the first cut section of fabric at a point adjacent to the photo-cell of the second photoelectric relay PER–2. In this position, the first cut section of fabric is located on the conveying means 6, just above the splicing means 7, in correct position for the splicing means 7 to be raised.

After the time delay period has passed and the dynamic braking has stopped the conveyor drive motor M–3, time delay relay TD drops out, thereby de-energizing the dynamic braking relay DB which, in turn, disconnects the D.C. source from the conveyor drive motor M–3 through its contacts 341 and 342. Additionally, contacts 347 of the dynamic braking relay DB close to complete the preconditioned energization circuit to the "raise splicing means" solenoids SV–5A. The circuit through which control voltage is applied to solenoid SV–5A may be traced commencing on FIG. 23A at auxiliary control voltage conductor 270, through contacts LS–9B of limit switch LS–9, which is actuated at this time due to the splicing means 7 being in its lower position, through conductors 307 and 345 (FIG. 23B), through contacts 346A of raise splicing means control relay CR–4, which is energized at this time, and through the now closed contacts 347 of dynamic braking relay DB to solenoid SV–5A.

Referring to FIG. 16, it may be seen that the energization of solenoid SV–5A causes pneumatic pressure to be applied to power cylinder 139 in a direction to extend its piston rod outwardly from the power cylinder. This, in turn (FIG. 10), results in the lifting of the splicing means 7 to its raised position, thereby de-actuating limit switch LS–9 and actuating limit switch LS–10.

It is of interest at this point to note that the actuation and de-actuation of limit switch LS–9 by the splicing means 7 controls the operation of the magnetic clutch 148 (FIG. 23C and FIG. 1), by means of which the fabric wind-up conveyor 151 (FIG. 11) is driven. The circuitry utilized to control magnetic clutch 148 may be better understood by reference now to FIGS. 23A, 23B and 23C. Control voltage from auxiliary control voltage conductor 270 is applied through contacts LS–9B (FIG. 23A), conductor 307, conductor 345 (FIG. 23B and FIG. 23C), conductor 349, conductor 350, and contacts 351 of automatic cycle relay ACR, which is energized throughout the entire automatic cycle of operations of the machine, to a voltage rectifying bridge network, shown generally at 352, which converts the A.C. control voltage to a D.C. voltage for energizing the magnetic clutch 148. Thus, so long as the automatic cycle relay ACR is energized, the operation of the magnetic clutch 148 will be directly under the control of limit switch LS–9, which is actuated by the raising and lowering of the splicing means 7. The net result of the foregoing arrangement is that whenever the splicing means 7 is in its lower position the magnetic clutch 148 will be energized to drive the fabric wind-up conveyor 151 and whenever the splicing means 7 is in its raised position the magnetic clutch 148 will be de-energized to stop the fabric wind-up conveyor 151.

When the splicing means 7 was raised to lift the trailing edge of the first cut section of fabric clear of the conveying means 6, thereby de-actuating limit switch LS–9, this action also resulted in the de-energization of raise splicing means control relay CR–4, due to the removal of control voltage from lead 345 (FIG. 23B) by the opening of contacts LS–9B (FIG. 23A). The de-energization of control relay CR–4 causes its contacts 304 (FIG. 23A) to close and, assuming that by this time the cutting operation of the second section of fabric has been completed and the clamp carriage 39 is in the fabric clear position, limit switch LS–8 will be actuated, thereby completing a circuit through its contacts LS–8B and the now closed contacts 304 to energize transfer fabric control relay CR–2 from auxiliary control voltage conductor 284. It will be understood, of course, that limit switch LS–2 (FIG. 23) is actuated at this time to apply control voltage to conductor 284 due to the platform means 99 being raised during the cutting operation of the second section of fabric.

Energization of transfer fabric control relay CR–2 at this time causes its contacts 305 to close, thereby applying control voltage to the "lower platform means" solenoid SV–3B which, in turn, causes the platform means 99 to be lowered (FIG. 16). Similarly, contacts 353 of control relay CR–2 (FIG. 23A) will close, thereby locking control relay CR–2 in the energized condition by means of an energization circuit including control voltage lead 270, the now closed contacts LS–9A, which closed when the splicing means 7 was raised, and contacts 353 of control relay CR–2. Additionally, contacts 302A (FIG. 23) and contacts 282 of control relay CR–2 will open with the energization of control relay CR–2 to remove control voltage from the "clamp carriage to clear position" solenoid valve SV–4 and provided an inter-lock against the energization of "raise platform means" solenoid SV–3A, which might otherwise subsequently raise the platform means 99 while the cutting means 5 is being reloaded with a third section of fabric to be cut.

The energization of the "lower platform means" solenoid SV–3B by control relay CR–2 (FIG. 23A) causes the platform means 99 to lower, thereby de-actuating limit switch LS–2 and actuating limit switch LS–1 (FIG. 9). The closing of limit switch LS–1 (FIG. 23) in turn, initiates the energization of the "clamp carriage to clamping position" solenoid SV–1A to recommence loading of the cutting means 5 with its third section of fabric to be cut. The sequence of events that comprise the third loading operation is denoted on FIG. 15 by the letter $A^2$, occurring at vertical step-line 25, and is a duplication of the sequential steps occurring from vertical step-lines 4 through 8 of FIG. 15, which are denoted by the letter A.

Concurrently with the energization of solenoid SV–1A by limit switch LS–1, high speed operation of the conveying means 6 occurs when the limit switch LS–1 energizes conveyor cycle control relay CR–5 (FIG. 23C). Control relay CR–5 is energized as follows. Control voltage is applied from conductor 270 (FIG. 23) through the now closed limit switch LS–1 to conductor 312. Conductor 312 may be traced to FIG. 23B wherein voltage is fed through limit switch LS–10, which is now closed due to the splicing means 7 being raised to lift the first cut section of fabric clear of the conveying means 6, to lead 354, which, in turn, may be traced down to FIG. 23C, through contacts 355 of control relay CR–6 which is de-energized at this time, to control relay CR–5 to energize that relay. Thus, in addition to initiating the third loading operation of the cutting means 5, the actuation of limit switch LS–1 due to the lowering of the platform means 99 also energizes control relay CR–5 to initiate subsequent operations of the machine.

The lowering of platform means 99 places the second cut section of fabric onto the conveying means 6 in order to bring the second section of fabric to the area of the splicing means 7 and effect a splice between the first and second cut sections of fabric. Energization of conveyor cycle control relay CR–5, as previously indicated, results in operation of the conveying means 6 at high speed. This is accomplished by the closing of contacts 356 of control relay CR–5 and, since the splicing means 7 is raised at this time and limit switch LS–10 is closed, control voltage is fed from lead 312, through limit switch LS–10, the now closed contacts 356 of control relay CR–5, lead 357, lead 358, contacts 359 of photoelectric relay PER–1, which is energized at this time since its photo-cell is being hit by the light source, contacts 314 of low speed conveyor drive motor relay 3ML, which is de-energized at this time, to energize high speed conveyor drive motor control relay 3MH. Relay 3MH, in turn, through its contacts 315 through 317, energizes the high speed windings of the conveyor drive motor M-3 from the 440 volt lead lines L1, L2 and L3. As before, the energization of control relay 3MH, in addition to actuating the conveyor drive motor M-3 into operation at high speed, results in the time delay relay TD being picked up through its contacts 319.

The high speed operation of the conveying means 6, which carries the second cut section of fabric from the area of the cutting means 5 to the area of the splicing means 7, is interrupted when the leading edge of the second cut section of fabric reaches the photo-cell of the first photoelectric relay PER-1. At this time the next sequence of events begins with the de-energization of photoelectric relay PER-1 as its light source is intercepted. When this occurs, contacts 359 of relay PER-1 are opened, thereby breaking the circuit to high speed conveyor drive motor relay 3MH and dropping that relay out. The dropping out of relay 3MH causes its contacts 322 to close in the low speed conveyor drive motor relay 3ML circuit, thereby energizing the low speed relay as follows (FIG. 23B). Control voltage from lead line 312 is fed through limit switch LS-10, which is closed at this time due to the splicing means 7 being raised, contacts 356 of conveyor cycle control relay CR-5, which is energized at this time, lead 357, normally closed contacts 360 of the de-energized photoelectric relay PER-1, normally closed contacts 328, lead 329, and the closed contacts 322 of high speed conveyor drive motor relay 3MH, to energize low speed conveyor drive motor relay 3ML. The energization of relay 3ML, in turn, applies driving power to the low speed windings of conveyor drive motor M-3 through its contacts 330 through 332. As before, the time delay relay TD remains energized during the switchover from high speed to low speed operation by virtue of its time delay feature and the contacts 319 and 320 in its control voltage supply circuit. Similarly, with the dropping out of high speed conveyor drive motor relay 3ML and consequent closing of its contacts 335 in the dynamic braking relay DB circuit, the relay DB picks up to cause the conveyor drive motor M-3 to operate at a crawling or creeping speed.

The conveying means 6 then continues to move the second cut section of fabric towards the splicing means 7 at a very slow rate of speed until the leading edge of the second cut section of fabric blocks the light beam to the photo-cell of the second photoelectric relay PER-2, causing the relay to become de-energized. This action initiates the next sequential step in the splicing operation during which the leading edge of the second cut section of fabric is passed beneath the raised trailing edge of the first section of fabric by a metered amount of overlap. When photoelectric relay PER-2 drops out due to the leading edge of the second cut section of fabric passing thereby, its contacts 361 close, thereby applying control voltage to a revolution counter relay RC through an energization circuit as follows. Control voltage from conductor 312 (FIG. 23B) passes through limit switch LS-10, which is closed at this time due to the splicing means 7 being raised, then through contacts 356 of conveyor cycle control relay CR-5, which is energized at this time, through contacts 362 of control relay CR-5, through the afore-mentioned contacts 361 of photoelectric relay PER-1, and thence through lead line 363 and contacts 364 of energized dynamic braking relay DB, to energize the revolution counter relay RC. The energization of the revolution counter relay RC closes its contacts 365 to provide an alternate source of energization for this relay that bypasses contacts 361 of relay PER-2 and, additionally, relay RC actuates the overlap and lower splicing means control relay CR-6 through its contacts 366, which close a circuit between lead 363 and the control relay CR-6.

The revolution counter relay RC is also provided with a mechanical clutch, gearing, and cam means (not shown) by which the revolution counter is mechanically coupled to the conveyor drive motor M-3 during the time that relay RC is picked up so that, after a predetermined number of turns of the conveyor drive motor M-3 at low speed, the cam means will be actuated to operate against the action of the revolution counter relay RC to thereby cause the relay to be mechanically moved to a dropped out state even though it remains energized. The connection between the revolution counter cam means and gears may be made adjustable in order that the amount of overlap between the trailing edge of the first cut section of fabric and the leading edge of the second cut section of fabric may be varied as desired by the operator. Upon mechanically dropping out the revolution counter relay RC, the conveyor drive motor M-3 will be stopped to allow the subsequent splicing action to take place. The manner in which conveyor drive motor M-3 is stopped is as follows. When overlap and lower splicing means control relay CR-6 picked up as the result of revolution counter relay RC initially being energized (FIG. 23B), it locked itself in through its contacts 367, the control voltage being applied from auxiliary control voltage lead 270 through normally closed contacts 368 of control relay CR-3, which was de-energized at that time. Additionally, contacts 355 of control relay CR-6, which are in the circuit to conveyor cycle control relay CR-5, were opened with the energization of control relay CR-6 to thereby de-energize control relay CR-5. With the de-energization of control relay CR-5, its contacts 356 and 362 open, thereby breaking one of the parallel circuits through which low speed conveyor drive motor relay 3ML is energized. The relay 3ML, thus, remains energized during the time when revolution counter relay RC is energized through only the following circuit. Control voltage from lead line 270 (FIG. 23B) is conducted through contacts 368 of control relay CR-3, which is de-energized at this time, through contacts 367 of the overlap and raise splicing means control relay CR-6, which is energized at this time, through contacts 366 of revolution counter relay RC, which is energized at this time, through lead 363, through contacts 365 of revolution counter relay RC, which is energized at this time, through contacts 328, which are normally closed, through lead 329, and through normally closed contacts 322 of high speed conveyor drive motor relay 3MH, which is de-energized at this time, to energize the low speed conveyor drive motor relay 3ML. Thus, when the revolution counter relay RC is mechanically de-energized, its contacts 365 and 366 open to thereby break the circuit by which the low speed conveyor drive motor relay 3ML is energized. This, in turn, results in power being disconnected from the low speed windings of the conveyor drive motor M-3 by the opening of contacts 330 through 332 of the relay 3ML. As before, dynamic braking remains applied to one of the high speed windings of the conveyor drive motor for a short period of time until the time delay relay TD is de-energized, thereby dropping out the dynamic braking relay DB. When relay DB drops out, its contacts 364 open to also cause electrical de-energization of the revolution counter relay RC, in addition to the mechanical de-actuation previously described.

The de-energization of the dynamic braking relay DB and the consequent closing of its contacts 369, results in the energization of the "lower splicing means" solenoid SV-5B, which, in turn (FIG. 16), causes the splicing means 7 to be lowered. The circuit through which solenoid SV-5B is energized is as follows. Control voltage is fed to lead 354 through limit switch LS-10, which is closed due to the splicing means 7 being raised, through the normally closed contacts 370 of control relay CR-5, which is de-energized at this time, through the aforementioned contacts 369 of the dynamic braking relay DB, through contacts 371 of control relay CR-6, which is energized at this time, to energize the solenoid SV–5B and lower the splicing means 7.

When the splicing means 7 is lowered, the trailing edge of the first cut section of fabric and the leading edge of the second cut section of fabric, which are overlapped by a predetermined amount, come into contact with each other and, due to their tacky calendered surfaces, stick together to form an effective splice between the two cut sections of fabric. Additionally, the lowering of the splicing means 7 results in the de-actuation of limit switch LS–10 (FIG. 23B) and subsequent actuation of limit switch LS–9 (FIG. 23A). This, in turn, causes the energization of magnetic clutch 148 (FIG. 23C) which starts up the wind-up conveyor 151 (FIG. 11). The circuit by which magnetic clutch 148 is energized includes contacts LS–9B of limit switch LS–9, lead 307, lead 345, lead 349, contacts 351 of automatic cycle relay ACR, which is energized at all times during automatic operation of the machine, and the rectifier bridge network 352.

The lowering of the splicing means 7, and consequent actuation of limit switch LS–9 also results in the reenergization of conveyor cycle control relay CR–3 as follows. Control voltage from lead 270 (FIG. 23A) passes through contacts LS–9B of limit switch LS–9, through contacts 318 of photoelectric relay PER–1, which is de-energized at this time, through lead 310 (FIG. 23B), and through contacts 311 of transfer fabric control relay CR–2, which is energized at this time, to energize control relay CR–3. The energization of transfer fabric control relay CR–3, in turn, causes both the de-energization of the overlap and lower splicing means control relay CR–6 and the energization of high speed conveyor drive motor relay 3MH as follows. When control relay CR–3 picks up, its contacts 368 open in the circuit through which control relay CR–6 is supplied with its control voltage. Similarly, contacts 313 of control relay CR–3 close when that relay is energized to apply control voltage from lead 312, through lead 358, and contacts 314 of low speed conveyor drive motor relay 3ML, to energize high speed conveyor drive motor 3MH. The energization of high speed conveyor drive motor relay 3MH, in turn, applies 440 volt power to the high speed windings of the conveyor drive motor M–3 via its contacts 315 through 317. Thus, with both the conveyor drive motor M–3 and the wind-up conveyor 151 (FIG. 11) being driven, the spliced first and second sections of fabric will move from the splicing means 7 into the fabric wind-up means 8 to commence the winding up of the spliced continuous strip of bias-cut fabric. As in the previous operations of the conveyor drive motor M–3 at high speed, the energization of conveyor high speed drive motor relay 3MH causes energization of the time delay relay TD by virtue of its contacts 319.

High speed operation of the conveying means 6 and the wind-up conveyor 151 continues until the trailing edge of the second cut section of fabric reaches the first photoelectric relay PER–1 and allows the light from the light source to hit the photo-cell of that relay. When this occurs, photoelectric relay PER–1 becomes energized and, in turn, causes conveyor cycle control relay CR–3 to be de-energized, since the normally closed contacts 318 of relay PER–1 are opened upon energization of that relay. The dropping out of control relay CR–3, in turn, causes high speed conveyor drive motor relay 3MH to also drop out by virtue of the opening of its contacts 313. Additionally, the dropping out of control relay CR–3 causes transfer fabric control relay CR–2 (FIG. 23A) to also be de-energized. This occurs when contacts 372 of control relay CR–3 are opened to remove control voltage from a circuit leading to the control relay CR–2. It will be understood at this point, by reference to FIG. 23A, that control relay CR–2 may be retained in an energized condition by means of a plurality of parallel control voltage supply paths including the contacts 372 of control relay CR–3 just mentioned, the contacts LS–8B of limit switch LS–8, the contacts LS–9A of limit switch LS–9, and by another path including contacts 373 of control relay CR–6. Although, initially, control relay CR–2 is picked up through contacts LS–8B when the raise splicing means control relay CR–4 is de-energized and its contacts 304 close, one or another of the foregoing parallel control voltage supply paths to control relay CR–2 will remain closed during the period that control relay CR–2 must remain picked up. Control relay CR–2 is eventually dropped out by the opening of contacts 372 of conveyor cycle control relay CR–3 at a time when each of the other parallel control voltage supply paths are open.

When photoelectric relay PER–1 is picked up due to the uncovering of its photo-cell by the trailing edge of the second cut section of fabric, the sequential operation of the electrical control system becomes repetitive and the subsequent steps of the machine are merely repetitious of previous operations. Thus, referring to vertical step line 34 on FIG. 15, it will be seen that the various components of the machine are all in a similar condition of actuation or energization as that which appears at vertical step line 18 on FIG. 15. In addition, since the first bias-cut section of fabric has been processed through the machine, the second bias-cut section of fabric has been spliced to the first section, and a third section of fabric has been loaded into the cutting means 5, the remaining sequential operations of the machine will merely repeat those actions which occur between vertical step line 18 and vertical step line 34 of FIG. 15. The machine, thus, will sequentially bias-cut, splice and wind up successive sections of fabric at a rapid rate, until such time as either the fabric feed roll has to be replaced or the operator desires to stop the machine for some other reason.

In order to provide manual overriding controls by which the operator may supersede various of the automatic sequential operations, push button switches are provided in the control voltage circuit to the automatic cycling relay ACR (FIG. 23). For example, should it be desired during the cutting stroke, or immediately thereafter, to reverse the direction of movement of the cutter carriage 114 (FIG. 1), a cutter carriage reverse drive push button switch 374 (FIG. 23) having normally closed contacts 375 in the energization circuit of automatic cycling relay ACR may be depressed. The depression of cutter carriage reverse drive push button switch 374 causes automatic cycling relay ACR to drop out, thereby stopping subsequent automatic cycling of the machine from occurring. Normally closed contacts 376 and 377, which are opened upon depression of the push button switch 374, are provided to break the control voltage circuit to the "open clamping means" solenoid SV–2B in order to prevent the release of the fabric being cut during the reversing movement of the cutter carriage 114. Normally open contacts 378 are provided on push button 374 for applying control voltage from control voltage lead 261, through the aforementioned contacts 378, limit switch LS–6, which is closed at all times during the cutting stroke after the cutter carriage 114 has passed the braking position at LS–6, through contacts 295 of cutter carriage forward drive motor relay 2MF, which would be de-energized by the dropping out of the automatic cycle relay ACR, to energize cutter carriage reverse drive motor relay 2MR. Thus, cutter carriage reverse drive motor relay 2MR will be picked up by the depression of push button 374 and, in turn, causes the cutter carriage 114 to be driven in a return stroke direction. It is apparent that, in order to recommence automatic operations once the automatic cycling relay ACR has been de-energized, it will be necessary to again depress automatic cycle start push button 268.

Similarly, a cutter carriage forward drive push button switch 379 is provided in the control voltage circuit to automatic control relay ACR. When this push button switch is depressed, its contacts 380 also drop out automatic control relay ACR to allow manual overriding of the automatic cycle of operations. Cutter carriage forward drive push button switch 379 may be depressed when it is desired to move the cutter carriage 114 (FIG. 1) in a forward direction towards completion of a cutting stroke. This feature is desirable when initially starting up the machine with a new roll of fabric to be cut in order to make the initial cut of the fabric so that the leading edge thereof will correspond to the angle of cut. Depression of push button switch 379 closes its contacts 381, which connect control voltage from conductor 261 to cutter carriage forward drive motor relay 2MF through contacts LS-7A of deactuated limit switch LS-7 and normally closed contacts 287 of de-energized cutter carriage reverse drive motor relay 2MR. Cutter carriage reverse drive motor relay 2MR is de-energized at this time due both to the dropping out of automatic cycle relay ACR with its subsequent de-energization of control voltage lead 270, and to the opening of contacts 286 of push button switch 379, which prevents indirect energization of relay 2MR from conductor 284 when contacts 288 of relay 2MF close.

A conveyor drive push button switch 382 is also provided in the control voltage circuit to automatic cycle relay ACR. As before, its contacts 383 will open to de-energize the automatic cycling relay ACR when the push button 382 is depressed. Depression of conveyor drive push button switch 382 will cause the conveyor drive motor M-3 to operate at low speed. It will also cause the magnetic clutch 148 to be picked up, thereby also driving the wind-up conveyor 151 at low speed. This is accomplished by means of contacts 384 (FIG. 23B) and 385 (FIG. 23C), respectively. When push button switch 382 is depressed and the automatic cycle relay ACR drops, out control voltage is led from control voltage conductor 261 (FIG. 23B) through contacts 386 of automatic control relay ACR, which are closed at this time due to that relay being de-energized, through the now closed contacts 384 of push button switch 382, through lead 329, and through the normally closed contacts 322 of high speed conveyor drive motor relay 3MH, which is de-energized at this time due to the de-energization of automatic control relay ACR, to energize the low speed conveyor drive motor relay 3ML. Thus, low speed conveyor drive motor relay 3ML will be picked up to override the automatic sequential controls when push button switch 382 is depressed and the conveying means 6 will commence low speed operation. In a like manner, magnetic clutch 148 is energized by the depression of the conveyor drive push button switch 382 through the following circuit. Control voltage from conductor 261 (FIG. 23B) is led through the now closed contacts 386 of automatic control relay ACR, through a lead 387, through the closed contacts 385 of push button switch 382, to the voltage rectifying bridge network 352, and thence, as a D.C. voltage, to the magnetic clutch 148. The closing of contacts 385 of push button switch 382 also feeds control voltage through contacts 388 of the automatic cycling relay ACR, which are closed at this time due to the relay being de-energized, to provide control voltage to the "lower splicing means" solenoid SV-5B. This is done to insure that the splicing means 7 will be lowered when manual operation of the windup conveyor 151 is commenced.

As pointed out earlier in the description of the electrical control system, a system stop push button switch 259 (FIG. 23) is provided for shutting down the control circuits of the machine. When stop button 259 is depressed, it opens the control voltage circuit to the cutter motor relay 1M, thereby dropping that relay out. Additionally, it cuts control voltage power from the automatic cycling relay ACR, which in turn de-energizes the remainder of the system. Since the system stop push button 259 might be depressed during any one of a variety of different conditions of operation of the machine, provisions have been incorporated in the electrical control system to assist restarting at the correct point in the sequence of operations. This is, in part, provided for by various of the limit switches that have previously been discussed as controlling the sequence of operations; however, in the event that the system stop push button switch 259 is depressed to stop the system when the platform means 99 is raised (LS-2 actuated), the cutter carriage 114 has completed a cutting stroke but has not yet returned to the start position (LS-5 de-actuated), and the fabric clamping means 40 has opened (LS-3 actuated), a set of contacts 389 are provided on automatic cycle start push button 268 (FIG. 23) to apply control voltage for energizing meter fabric control relay CR-1 to restart the machine in the condition of operation at which it was shut down. When automatic cycle start push button switch 268 is depressed to recommence operation of the machine at this time, control relay CR-1 will be energized through a circuit including auxiliary control voltage lead 270, limit switch LS-2, which is closed because the platform means 99 is raised, contacts LS-3A of limit switch LS-3, which are closed due to the fabric clamping means 40 being open, and the aforementioned contacts 389 of push button switch 268. Contacts 301A of automatic cycle start push button switch 268 serve to disconnect the "clamp carriage to clear position" solenoid of solenoid valve SV-4 from any source of control voltage upon depression of push button 268. This is necessary in order to avoid inadvertent movement of the clamp carriage 39 to the fabric clear position at an inopportune time. For example, when transfer fabric control relay CR-2 is energized, its contacts 302A provide an interlock in the energization circuit of solenoid SV-4. Should the system have been shut down at a time when control relay CR-2 was energized, its contacts 302A will close and, upon subsequent restarting of the machine, solenoid SV-4 must be disconnected until control relay CR-2 has had time to pick up again. This function is performed by contacts 301A of push button switch 268.

It will be understood that the electrical control system described may contain additional safety features and modifications that have not been discussed. For example, a plurality of overload switches might be placed in series with the system stop push button switch 259 (FIG. 23) for automatically stopping the system should any of the various drive motors M-1 through M-4 be overloaded due to a malfunction in the machine. Similarly, emergency stop switches might be located at strategic points surrounding the machine in order to allow an operator to stop the machine from various positions. These emergency stop switches would also be placed in series with the emergency stop push button switch 259.

It is apparent from the previous overall description of the automatic bias cutting and splicing machine that many of the former manual operations that were necessary in the fabrication of a continuous strip of bias-cut calendered tire fabric have been obviated by the machine herein described. Once the roll of fabric to be cut has been loaded on to the machine and aligned with the cutting stroke axis for subsequent automatic operation, the machine takes over to bias-cut the fabric into uniform, successive rhombic sections having accurately measured widths. It then joins each of the successive sections in end-to-end relation to provide a continuous strip of bias-cut fabric in which all of the sections are in accurate longitudinal alignment with each other. Moreover, the amount of overlap between successive strips is carefully metered to insure splicing uniformity, the lack of which is one of the major disadvantages in the manual splicing of bias-cut fabrics.

The positive width control of the bias-cut sections, combined with the ease by which the width of the bias-cut sections may be changed in order to facilitate the use of the bias-cut fabric with various sized tires, is another important advantage of the machine. Similarly, the provision incorporated herein for changing the bias cutting angle, along with the resultant automatic realignment of both the fabric clamping means 40 and the splicing means 7, represents a further substantial improvement over the prior methods of fabricating bias-cut tire fabric. Finally, it should be pointed out that the automatic sequential operation of this machine, as distinguished from the periodical or timer controlled operation of prior art machines, represents a major improvement in this field in that the output of the machine is appreciably higher than that which could be achieved with a comparable timer operated machine. This advantage results from the fact that each step of the operation is initiated by the completion of a previous step, rather than by being dependent upon a periodical or timed cycle of operation. Thus, for example, the rate of production of a machine made in accordance with this invention would vary as the width of the bias-cut fabric is changed, whereas in timer controlled machines the rate of production would be fixed by the time needed to process the widest size of tire fabric.

While particular embodiments of this invention have been shown and described, it will be obvious to those skilled in the art that various changes and modifications may be made without departing from this invention in its broader aspects, and it is, therefore, aimed in the appended claims to cover all such changes and modifications as fall within the true spirit and scope of this invention.

Having thus described our invention, what we claim and desire to protect by Letters Patent is:

1. A machine for bias cutting a tire fabric comprising: fabric feeding means including a fabric let-off unit adapted to receive and unwind the fabric to be cut, and a fabric pull-out unit carried by said fabric feeding means and constructed and arranged to intermittently withdraw predetermined lengths of fabric from said fabric let-off unit; fabric cutting means having its cutting axis disposed at an angle to the longitudinal axis of said feeding means for cutting said fabric at a bias angle; pivotal means pivotally locating said fabric feeding means with respect to said fabric cutting means such that pivotal movement of said fabric feeding means effects a change in the angle of the bias-cut; and cutting angle adjusting means operatively connected to said fabric feeding means for pivoting said fabric feeding means with respect to said cutting means to vary the angle of the cut.

2. A machine as described in claim 1 and further including conveying means positioned substantially parallel to said cutting axis of said cutting means and at a lower level than said cutting means for receiving and removing cut sections of fabric therefrom.

3. A machine as described in claim 2 and further including splicing means positioned to receive the cut sections of fabric from said conveying means and constructed and arranged to join the fabric sections in overlapped endwise relation to form a strip of bias-cut fabric.

4. A machine as described in claim 3 and further including fabric wind-up means positioned adjacent to said splicing means and incuding a wind-up roll for receiving the fabric as it discharges from said splicing means and winding said fabric into a roll of continuous bias-cut fabric.

5. A machine as described in claim 2 and further including reciprocable platform means operative in one position to support the fabric to be cut during the cutting stroke and operative in a second position to lower the cut fabric onto said conveying means.

6. A machine as described in claim 5 wherein said conveying means comprises a plurality of endless belts laterally positioned in spaced apart relation, and said platform means comprises a plurality of vertical plates, each of said plates being interspersed between different adjacent belts of said conveying means and being rigidly connected to one aonther for simultaneous vertical movement between said one position and said second position.

7. A machine as described in claim 3 wherein said conveying means comprises a plurality of endless belts disposed side by side in laterally spaced apart relation, and wherein said splicing means incudes a plurality of vertically disposed plate members interspersed between said endless belts and constructed and arranged to be raised and lowered as a unit such that they afford overlapping between the trailing edge of a preceding cut section of fabric located thereon when raised and the leading edge of a succeeding cut section of fabric located on said endless belts.

8. A machine as described in claim 4 wherein said fabric wind-up means comprises: conveying means constructed and arranged to receive said continuous strip of bias-cut fabric from said splicing means, and first and second wind-up rolls operatively positioned above said conveying means to receive said continuous bias-cut fabric thereon for winding said fabric into a conveniently handled roll, said wind-up means further including means connected to each of said first and second wind-up rolls for alternately raising and lowering each of the wind-up rolls into position to receive the bias-cut fabric.

9. A machine as described in claim 7 and further including metering means actuated by the leading edge of the succeeding section of bias-cut fabric while moving on said endless belts and including driving means for driving said endless belts for metering the amount of overlap between the trailing edge of the preceding cut section of fabric and the leading edge of the suceeding cut section of fabric.

10. In a machine for bias cutting a tire fabric, cutting means including a fixed support and a movable cutter assembly for cutting said fabric during a cutting stroke; fabric feeding means for intermittently advancing predetermined lengths of fabric past said cutting means, said fabric feeding means comprising a fabric let-off unit positioned adjacent one side of said cutting means and adapted to dispense fabric thereto, and a fabric pull-out unit positioned adjacent the other side of said cutting means for pulling said fabric past said cutting means in predetermined lengths, said pull-out unit including carriage means movably mounted on said feeding means between a first fabric clamping position and a second fabric cutting position; means pivotally supporting said fabric feeding means for rotation about said cutting means to change the angle of the bias-cut; and fabric clamping means pivotally carried by said carriage means and engageable with said cutting means when said carriage means is in said first position to thereby align said clamping means with the angle of the cut for clamping said fabric for movement with said carriage means.

11. A machine as described in claim 10 wherein said cutting means and said fabric clamping means each carry inter-engaging circuit controlling means for actuating said fabric clamping means to clamp said fabric when said carriage means is in said first fabric clamping position.

12. A machine as described in claim 11 and further including circuit means carried by said fabric clamping means and responsive to clamping of the fabric by said clamping means for initiating movement of said carriage means to its second fabric cutting position.

13. A machine as described in claim 12 and further including conveying means positioned parallel to and at a lower level than said cutting means; platform means positioned adjacent said cutting means and movable between a first fabric supporting position for supporting the fabric to be cut and a second fabric lowering position for lowering the cut section of fabric onto said conveying means; and circuit means responsive to the movement of said carriage means to said second fabric cutting position for raising said platform means to its fabric supporting position.

14. A machine as described in claim 13 and including circuit means actuated by movement of said platform means to its fabric supporting position for initiating operation of said cutting means to bias-cut the fabric.

15. A machine as described in claim 14 including means actuated by said cutting means at the completion of the cutting stroke for opening said fabric clamping means and moving said carriage means to a third fabric clear position.

16. A machine as described in claim 15 and further including circuit means responsive to movement of said carriage means to said third position for lowering said platform means and depositing the cut section of fabric on said conveying means.

17. In a machine for bias-cutting a calendered tire fabric, cutting means comprising a cutter carriage track, a cutter carriage carried by said cutter carriage track for movement therealong during a cutting stroke; fabric-feeding means positioned below said cutter carriage track and pivotally supported for angular movement with respect thereto, said fabric feeding means comprising a fabric let-off unit positioned to one side of said cutting means and adapted to receive and unwind the fabric to be cut, and a fabric pull-out unit positioned to the other side of said cutting means, said fabric pull-out unit comprising a fabric clamp carriage track, a fabric clamp carriage located upon said clamp carriage track for movement therealong between a first fabric-clamping position adjacent said cutting means and a second fabric-cutting position removed from said cutting means, driving means carried by said fabric feeding means and operatively connected with said clamp carriage for moving said clamp carriage between said first and second positions, clamping means pivotally carried by said clamp carriage and movable therewith for clamping said fabric beneath said cutter carriage track in said first position and retaining said fabric in the clamped position while said clamp carriage is driven to said second position; means responsive to the arrival of said clamp carriage in said second position and operative to drive said cutter carriage for initiating movement of said cutter carriage through a fabric cutting stroke, and means responsive to the completion of said fabric cutting stroke for unclamping said fabric clamping unit, thereby releasing said fabric.

18. A machine as described in claim 17 and further including conveying means disposed parallelly adjacent to and at a lower level than said cutter carriage track, said conveying means comprising a plurality of laterally spaced-apart endless belts for conveying said cut section of fabric away from the area of said cutting means.

19. A machine as described in claim 18 and further including platform means comprising vertically disposed movable plate members interspersed between said endless belts of said conveying means, said platform means having a lower position wherein said plate members are disposed below the level of said endless belts and an upper position wherein said plate members are disposed above the level of said endless belts, said platform means being positioned in said lower position during movement of said clamp carriage between its first and second positions; and means responsive to the arrival of said clamp carriage in its second position for raising said platform means to support said fabric during the cutting stroke.

20. A machine as described in claim 19 wherein said clamp carriage is provided with a third fabric clear position located at a greater distance away from said cutting means than said second fabric cutting position, and further including means responsive to the completion of said cutting stroke for moving said clamp carriage to said third position and concurrently unclamping said clamping means whereby the cut section of fabric is supported solely by said platform means.

21. A machine as described in claim 20 and further including means responsive to the arrival of said clamp carriage to said third fabric clear position and operatively connected to said platform means for lowering said cut section of fabric on to said endless belts.

22. A machine for bias cutting a tire fabric comprising: fabric feeding means for intermitently advancing predetermined lengths of fabric therefrom; fabric cutting means having its cutting axis disposed at an angle to the longitudinal axis of said fabric feeding means for cutting said fabric at a bias angle; conveying means positioned substantially parallel to and at a lower level than said cutting means for receiving and removing cut sections of fabric therefrom; and reciprocable platform means operative in one position to support the fabric to be cut during the cutting stroke and operative in a second position to lower the cut section of fabric onto said conveying means.

References Cited by the Examiner
UNITED STATES PATENTS

| | | | |
|---|---|---|---|
| 1,423,798 | 7/22 | Hennessy. | |
| 1,428,420 | 9/22 | Mattia | 83—393 |
| 1,728,163 | 9/29 | Maas | 83—271 |
| 1,888,744 | 11/32 | Shook | 83—68 |
| 2,487,149 | 11/49 | Leguillon | 156—502 |
| 2,581,937 | 1/52 | Secrest | 83—209 |
| 2,668,708 | 2/54 | Back | 154—42 X |
| 2,702,579 | 2/55 | Perry | 154—1 |
| 2,733,766 | 2/56 | Wikle | 83—271 |
| 2,940,506 | 6/60 | McKee | 156—502 |
| 2,962,083 | 11/60 | Hasselquist | 154—42 |
| 3,141,805 | 7/64 | Gough et. al. | 156—512 |

EARL M. BERGERT, *Primary Examiner.*

CARL F. KRAFFT, ALEXANDER WYMAN,
*Examiners.*